(12) United States Patent
Grossman et al.

(10) Patent No.: US 7,383,037 B2
(45) Date of Patent: Jun. 3, 2008

(54) LOTTERY CHANNEL

(75) Inventors: Joel K. Grossman, Allston, MA (US);
Kent H. Skinner, Kirkland, WA (US);
Albert W. Tan, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 104 days.

(21) Appl. No.: 10/943,564

(22) Filed: Sep. 17, 2004

(65) Prior Publication Data

US 2006/0063516 A1    Mar. 23, 2006

(51) Int. Cl.
*H04M 3/42*    (2006.01)
(52) U.S. Cl. ............... 455/414.1; 455/414.3; 455/566; 455/550.1; 455/412; 455/3.01
(58) Field of Classification Search ............ 455/414.1, 455/414.3, 550.1, 566, 412
See application file for complete search history.

(56) References Cited

U.S. PATENT DOCUMENTS

| | | | |
|---|---|---|---|
| 5,442,646 A | 8/1995 | Chadwick et al. ......... 714/795 |
| 5,854,985 A | 12/1998 | Sainton et al. ........... 455/553.1 |
| 6,014,606 A | 1/2000 | Tu ............................. 701/200 |
| 6,212,414 B1 | 4/2001 | Alameh et al. .......... 455/575.6 |
| 6,272,332 B1 | 8/2001 | Matsumoto et al. ..... 455/412.1 |
| 6,363,419 B1 | 3/2002 | Martin, Jr. et al. ......... 709/219 |
| 6,373,374 B1 | 4/2002 | Siemens ................... 340/309.8 |
| 6,480,783 B1 | 11/2002 | Myr ............................. 701/117 |
| 6,703,930 B2 | 3/2004 | Skinner ................. 340/539.11 |
| 6,853,911 B1 | 2/2005 | Sakarya ....................... 701/208 |
| 6,879,847 B1 | 4/2005 | Kato et al. ................... 455/566 |
| 6,973,318 B2 | 12/2005 | Jambhekar et al. ...... 455/456.1 |
| 2002/0058520 A1 | 5/2002 | Nakagawa .................. 455/456 |
| 2002/0090934 A1 | 7/2002 | Mitchelmore .............. 455/412 |
| 2002/0142268 A1* | 10/2002 | Dutta et al. ................. 434/106 |
| 2002/0160805 A1* | 10/2002 | Laitinen et al. ............ 455/550 |
| 2003/0069029 A1* | 4/2003 | Dowling et al. ............ 455/456 |
| 2003/0228910 A1* | 12/2003 | Jawaharlal et al. ........... 463/42 |
| 2004/0021555 A1* | 2/2004 | Faris .......................... 340/7.52 |
| 2004/0043760 A1 | 3/2004 | Rosenfeld et al. ....... 455/413.3 |
| 2004/0203674 A1 | 10/2004 | Shi et al. .................... 455/415 |
| 2004/0204143 A1 | 10/2004 | Chen .......................... 455/566 |
| 2004/0224662 A1 | 11/2004 | O'Neil et al. ............... 455/408 |

(Continued)

FOREIGN PATENT DOCUMENTS

WO    WO 99/35778    7/1999

(Continued)

OTHER PUBLICATIONS

U.S. Appl. No. 10/944,205, filed Sep. 17, 2004, Grossman et al.

(Continued)

*Primary Examiner*—Rafael Perez-Gutierrez
*Assistant Examiner*—Khai Nguyen
(74) *Attorney, Agent, or Firm*—Merchant & Gould P.C.

(57) ABSTRACT

The present invention provides lottery content to a user on a mobile device. The lottery content is automatically delivered and stored on a mobile electronic device for access by a user. Using the device, users can quickly access the lottery information they are interested in without having to type in information to specifically download the content to the device. The lottery channel is directed at providing a quicker and less cumbersome way of accessing lottery information as compared to having to access a web site or some other service.

24 Claims, 18 Drawing Sheets

U.S. PATENT DOCUMENTS

2005/0221821 A1    10/2005    Sokola et al. ............ 455/432.3
2006/0063567 A1*    3/2006    Grossman et al. .......... 455/566

OTHER PUBLICATIONS

U.S. Appl. No. 10/926,116, filed Aug. 24, 2004, Grossman et al.
U.S. Appl. No. 10/944,085, filed Sep. 17, 2004, Grossman et al.
U.S. Appl. No. 10/857,556, filed May 28, 2004, Grossman et al.
U.S. Appl. No. 10/903,710, filed Jul. 30, 2004, Grossman et al.
U.S. Appl. No. 10/856,474, filed May 28, 2004, Grossman et al.
U.S. Appl. No. 10/909,181, filed Jul. 30, 2004, Miller et al.
D. Burke, "The FM Wristwatch Radio", http://www.nvg.ntnu.no/Sinclair/radiowat.htm, last accessed Jul. 11, 2001, 1 page.
S. Reedy, "Sinclair Watch Radio", http://www.somerset.net/arm/transistors/Sinclair.html, last accessed Jul. 11, 2001, 4 pages.
Ambient Devices, http://www.ambientdevices.com/cat/platform.html, last accessed Sep. 5, 2002, 2 pages.
Ambient Devices, http://www.ambientdevices.com/cat/applications.html, last accessed Sep. 5, 2002, 3 pages.
E. Mueller, "A Calendar with Common Sense", ACM 2000, pp. 198-201.
B. Azvine et al., "The Intelligent Assistant: An Overview", Intelligent Systems and Soft Computing, LNAI 1804, Springer-Verlag, 2000, pp. 215-238.
T. Payne et al., "Calendar Agents on Semantic Web", IEEE Intelligent Systems, May-June 2002, 5 pgs.
S. Nylander et al., "Providing Device Independence to Mobile Services", User Interfaces for All, LNCS 2615, Springer-Verlag, 2003, pp. 465-473.
M.T. Raghunath et al., "User Interfaces for Applications on a Wrist Watch", Springer-Verlag, Personal and Ubiquitous Computing, vol. 6, 2002, pp. 17-30.
S. Mann, "Smart Clothing': Wearable Multimedia Computing and 'Personal Imaging'to Restore the Technological Balance Between People and Their Environments", ACM Multimedia, 1996, pp. 163-174.
S. Barnes et al., "Rising Sun: iMode and the Wireless Internet", Communications of the ACM, vol. 46, No. 11, Nov. 2003, pp. 79-84.
A. Adya et al., "Characterizing Alert and Browse Services for Mobile Clients", Microsoft Research, 14 pages.
S. Acharya et al., "Balancing Push and Pull for data Broadcast", Proceedings of ACM SIGMOD Conference, May 1997, pp. 1-12.
A. Carzaniga et al., "Content-Based Networking: A New Communication Infrastructure", Dept. of Computer Science, University of Colorado, 9 pages.
P. Tarasewich et al., "Issues in Wireless E-Commerce", ACM, 5 pages.
C. H. Leung et al., "Analysis of Mobile Commerce Market in Hong Kong", ACM, ICEC 2003, pp. 408-412.
G. Samaras et al., "Personalized Portals for the Wireless User Based on Mobile Agents", WMC '02, Sep. 28, 2002, pp. 70-74.
Timex - Data Link, http://www.timex.com/html/data_link.html, last accessed Sep. 8, 2004.
Traffic Gauge (tm) Mobile Traffic Map, http://www.trafficgauge.com/, last accessed Sep. 8, 2004, 2 pages.
ESPN.com, http://sports.espn.go.com/ncf/scoreboard, last accessed Dec. 16, 2004, 8 pages.
Free Daily Overview Horoscope, Astrology.com, http://horoscopes.astrology.com/dailysagittarious.html?arrivalSA=1&cobrandRef=0&arriv..., last accessed Dec. 16, 2004, 3 pages.
MSN Money - Financial Site, http://moneycentral.msn.com/home.asp, last accessed Dec. 16, 2004, 2 pages.
Yahoo Finance, http://finance.yahoo.com, last accessed Dec. 16, 2004, 3 pages.
AT&T Wireless, http://www.attwireless.com/personal/features/mmode/mmodeguide/content.jhtml, last accessed Dec. 16, 2004, 8 pages.
Moviefone: Who is Mr. Moviefone, http://movies.channel.aol.com/franchise/reeldeal/mrmoviefonbio.adp, last accessed Dec. 16, 2004, 4 pages.
AvantGo, Inc., http://www.avantgo.com/frontdoor/learn_more.html, last accessed Dec. 16, 2004, 3 pages.
MSN Mobile, http://mobile.msn.com/ac.aspx?cid=uuhp_alerts, last accessed Dec. 16, 2004, 2 pages.
Accu Weather, http://www.accuweather.com/adcin/public/index.asp?partner=accuweather, last accessed Dec. 16, 2004, 3 pages.
weather.com, http://www.weather.com/weather/local/98101?lswe=98101&wsa=WeatherLocalUndecla..., last eccessed Dec. 16, 2004, 4 pages.
Yahoo! Mobile, http://mobile.yahoo.com/?nosplash=1, last accessed Dec. 16, 2004, 2 pages.

* cited by examiner

Channel Customization

Home | Channels | Your Location | Your Account

Sign In

Horoscope
See what the starts have in store for you and your friends. Receive daily horoscopes for the astrological signs you want to track.

Select one or more astrological signs that you want to receive on your device.

☐ Aries March 21 – April 19
☐ Taurus April 20 – May 20
☑ Gemini May 21 – June 21
☐ Cancer June 22 – July 22

☐ Leo July 23 – Aug 22
☐ Virgo Aug 23 – Sept 22
☐ Libra Sept 23 – Oct 22
☐ Scorpio Oct 23 – Nov 21

☐ Sagittarius Nov 22 – Dec 21
☐ Capricorn Dec 22 – Jan 19
☑ Aquarius Jan 20 – Feb 18
☐ Pisces Feb 19 – March 20

Save | Cancel

LOTTERY CHANNEL

BACKGROUND OF THE INVENTION

Mobile electronic devices, such as cell phones, wireless PDAs, wireless laptops and other mobile communication devices are making impressive inroads with consumers. Many of the mobile electronic devices are able to perform a variety of tasks and include a user interface to help the user access the features associated with the device. For example, some mobile devices include a display unit that displays graphical data to support email, instant messaging, web browsing, and other non-voice features. Using their mobile devices, users access the Internet, send and receive email, participate in instant messaging, and perform other operations. Accessing the desired information, however, may be cumbersome for the user. When accessing the Internet, for instance, users have to log onto the network and then type in information to access the information they desire. Additionally, using the user interface to access the information may be difficult.

SUMMARY OF THE INVENTION

The present invention is directed at providing a lottery channel to a user on a mobile device.

According to one aspect of the invention, lottery content is automatically delivered and stored on a mobile electronic device for access by a user. Using the device, users can quickly access the lottery information they are interested in without having to type in information to specifically download the lottery content to the device. The lottery channel is directed at providing a quicker and less cumbersome way of accessing lottery information as compared to having to access a web site or some other service.

According to another aspect of the invention, the lottery channel includes several different views for categorically displaying different types of lottery information.

According to yet another aspect of the invention, the user may customize the lottery information they receive on their device. For example, using a web interface, the user may select which lottery games they wish to receive.

A more complete appreciation of the present invention and its improvements can be obtained by reference to the accompanying drawings, which are briefly summarized below, to the following detailed description of illustrative embodiments of the invention, and to the appended claims.

BRIEF DESCRIPTION OF THE DRAWINGS

FIG. 11 illustrates a web interface for selecting horoscopes;

DETAILED DESCRIPTION OF THE PREFERRED EMBODIMENT

Figure 1:
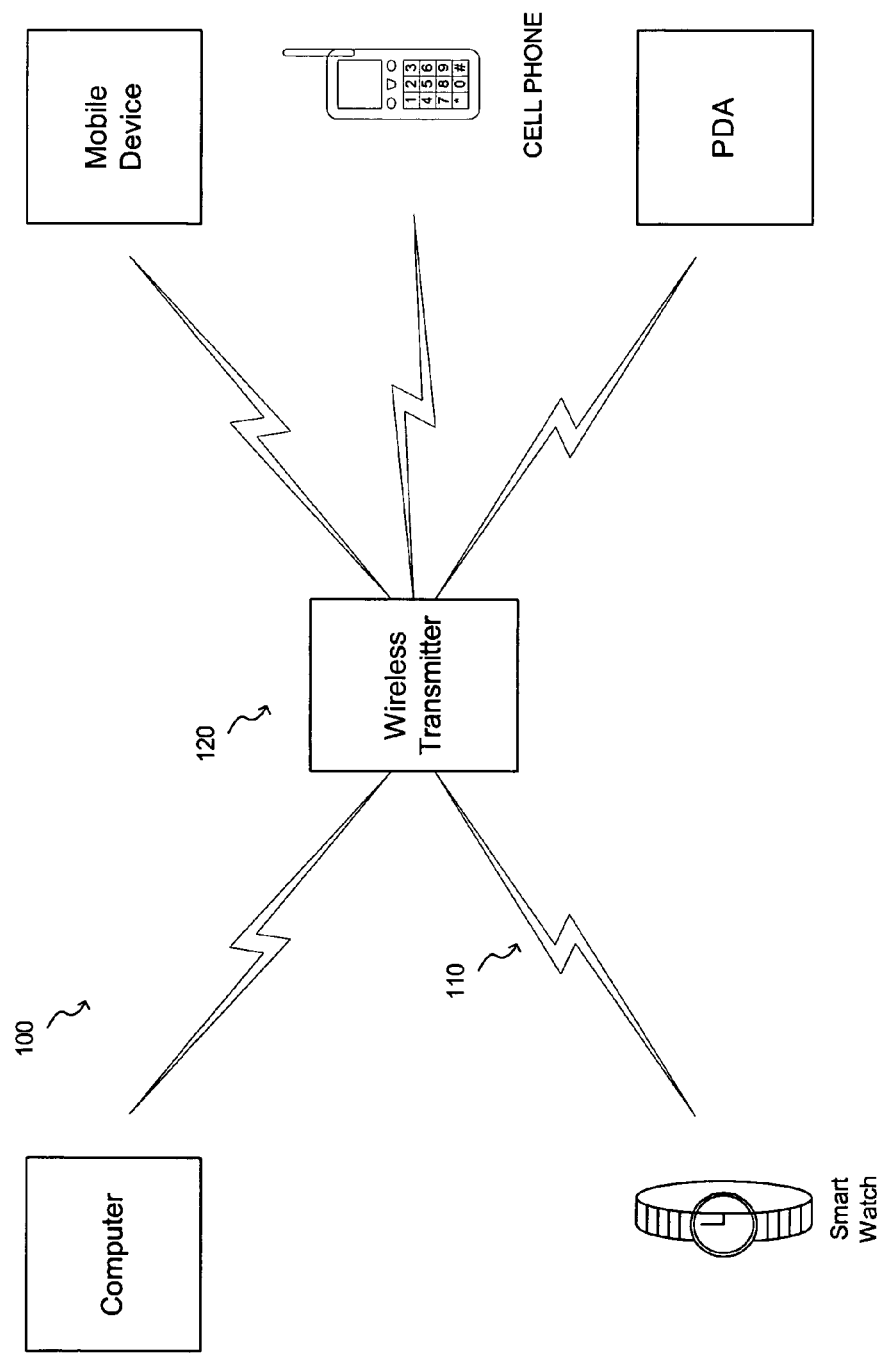
FIG. 1 illustrates an operating environment.

The apparatus, system, and method of the present invention are related to navigating through diversion content on a device that includes stored diversion related information. The diversion content may be selected and viewed on a display of the device by means of passive interaction (e.g., hands free operation) or active interaction (e.g., selecting buttons).

In the described embodiments, the electronic devices may be mobile devices, such as smart watches, that are specially configured to receive communication signals. The electronic devices may be configured to receive broadcast transmissions from one or more broadcast towers and are capable of receiving and processing messages from the broadcast transmissions.

The electronic devices store the received information such that the information is indexed according to designated channels. Each channel includes content that is organized according to a set of criteria. For example, diversion content is presented in separate channels based on the type of diversion data; wherein sports content is presented in another channel. Some channels may include content from one or more of the other channels. For example, a messages channel may include weather related alerts and news. After information is received and processed by the client device, a user may passively or actively review the information that is stored in the electronic device.

The diversion channels on each device may be customized based on user preferences such that the user experience is enhanced. An example diversion channel may be configured to display certain lottery game results, whereas another diversion channel may be configured to display selected horoscopes.

Although described here in the context of a watch-based system, other mobile or non-mobile devices, such as portable and desktop computers, personal digital assistants (PDAs), cellular telephones, and the like, may be used. The use of a watch is for illustrative purposes only to simplify the following discussion, and may be used interchangeably with "mobile device" and/or "electronic device".

The term "content" can be any information that may be stored in an electronic device. By way of example, and not limitation, content may comprise graphical information, textual information, and any combination of graphical and textual information. Content may be displayable information or auditory information. Auditory information may comprise a single sound or a stream of sounds.

Diversion Channels

The daily diversion channels are arranged to provide a user of a mobile electronic device simple access to daily diversions, such as lottery content, horoscope content, and other daily diversion content. According to one embodiment, the daily diversions are presented in three separate channels: a lottery channel; a horoscope channel; and a daily diversion channel. The user may customize the channels they receive on their devices. The user preferences and content may be provided as information that is retrieved from broadcast transmissions such as described herein.

Users are able to view the content based on their preferences. While using the daily diversion channels, users automatically receive broadcast lottery information, horoscope information, and other daily diversion information based on their selections.

The user interface is directed at providing a simple, easy way to access the data that is delivered to the device. Updates are periodically sent to the device without the user having to specifically request the content. Additionally, the user can request only the content that they care about.

Exemplary Smart Object Device

Figure 2:
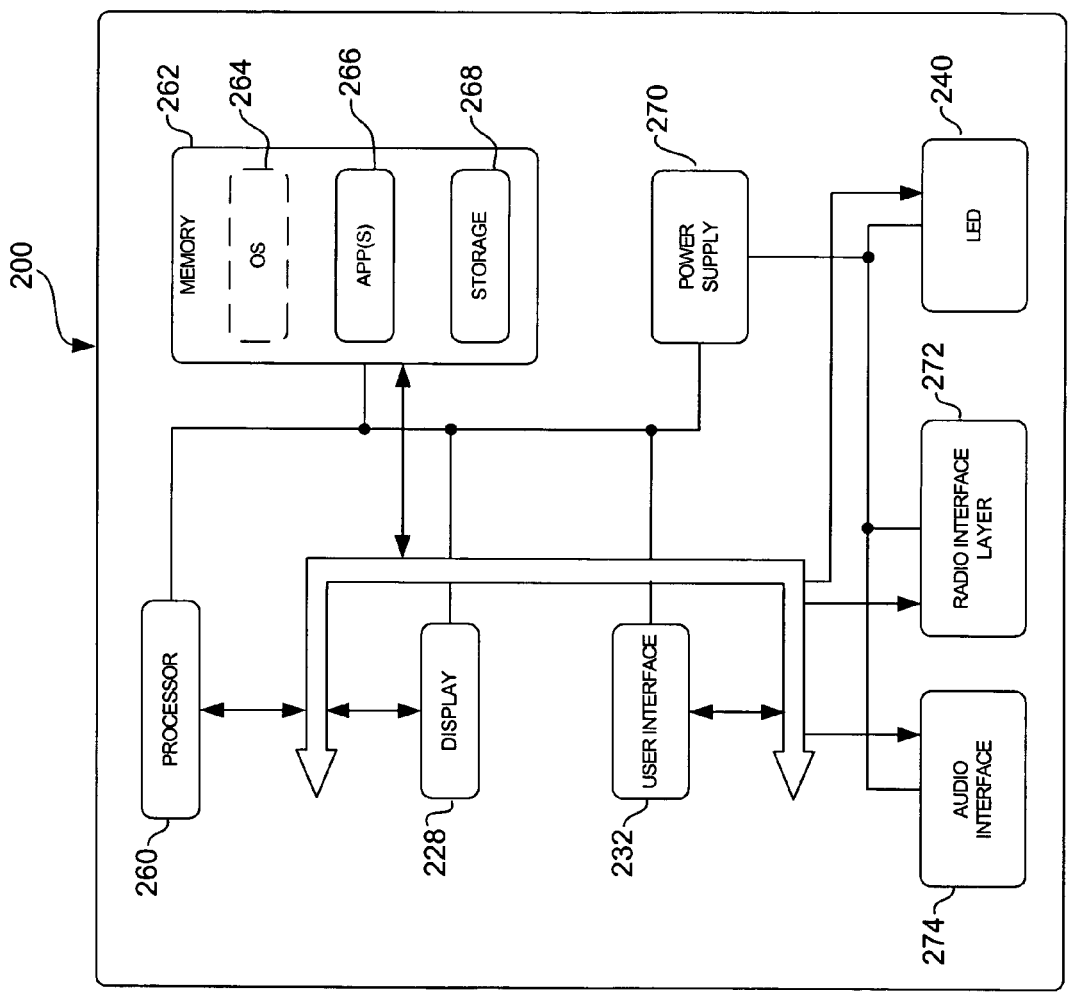
FIG. 2 shows an electronic device.
Figure 3:
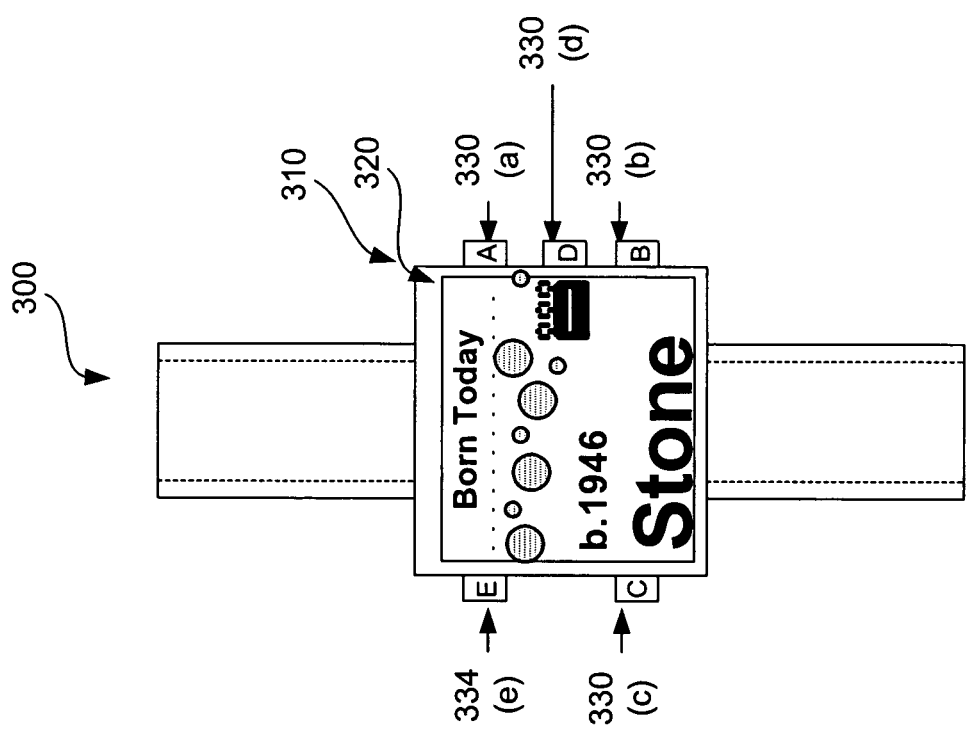
FIG. 3 illustrates an exemplary smart object watch devices that include a user interface for navigating through channels and content.

FIG. 3 illustrates an exemplary smart device that includes a user interface that is configured to interact with content from channels, in accordance with aspects of the invention. Watch device 300 includes bezel 310 which has an electronic system. The electronic system performs the functions in a manner that is consistent with the hardware that is described with respect to FIG. 2. Bezel 310 includes display 320, such as a liquid crystal display, a multiple bit display, or a full color display. In one embodiment, watch hands are electronically generated on display 320 when the user is in a time mode. In an alternative embodiment, the bezel includes analog-type watch hands that do not detrimentally interfere with display 320. As illustrated, display 320 shows a view in a diversion channel for a born today diversion.

Watch device 300 includes a series of selectors, such as buttons A-D (330a-d), which are arranged to operate as part of a user interface (UI). Each selector may have a default function and/or a context determined function. The currently selected channel determines the context for each selector. Alternatively, the currently active display may determine the context for each selector. For example, a display screen (e.g., a help screen) may be superimposed on the main display such that the display screen becomes the active context. Watch device 300 is context sensitive in that the function that is associated with each selector may change based on the selected channel or display screen.

Button "A" has a default function of page up or previous page in the currently selected channel. Button "A" may also have an alternate function based on the currently selected channel or display. Button "B" has a default function of page down or next page in the currently selected channel. Button "B" may also have an alternate function based on the currently selected channel or display. In one example, button "B" is activated for a predetermined time interval (e.g., two seconds) to select a "speed list browse" function.

Button "C" has a default function of next channel. Button "C" may also have an alternate function based on the currently selected channel or display. In one example, button "C" is activated for a predetermined time interval (e.g., two seconds) to select the main channel or "primary" channel. The main channel in an example watch device is the time channel that provides the user with time related information. However, devices may be configured to have some other display screen that is recognized by the device as a "primary" channel or "home" location.

Button "D" has a default (or "primary") function of "enter." The "enter" function is context sensitive and used to select the "enter" function within a selected channel (e.g., enter Game Mode), or to select an item from a selection list (e.g., select a game). Button "D" may also have an alternate function based on the currently selected channel or display. For example, the "D" selector is activated for a predetermined time interval (e.g., two seconds) to activate a delete function. In another example, the "D" button may be selected for a predetermined time to activate a help screen or an additional set mode. In this example, the help screen remains active while button "D" is activated, and the help screen is deactivated (e.g., removed from the display) when the "D" button is released. According to another embodiment, the "D" button may also perform another function; such as showing the date or time; initiating a custom action/animation; and the like.

The selectors are arranged such that the electronic device accomplishes navigating and selecting content on each channel in a simple manner. An optional fifth selector (e.g., button "E") may be arranged to provide other functions such as backlighting or another desired function. Other selectors may also be included.

Exemplary Diversion Channels and Views

FIGS. 7-14 are diagrams illustrating example views associated with diversion channels, in accordance with the present invention.

Figure 7:
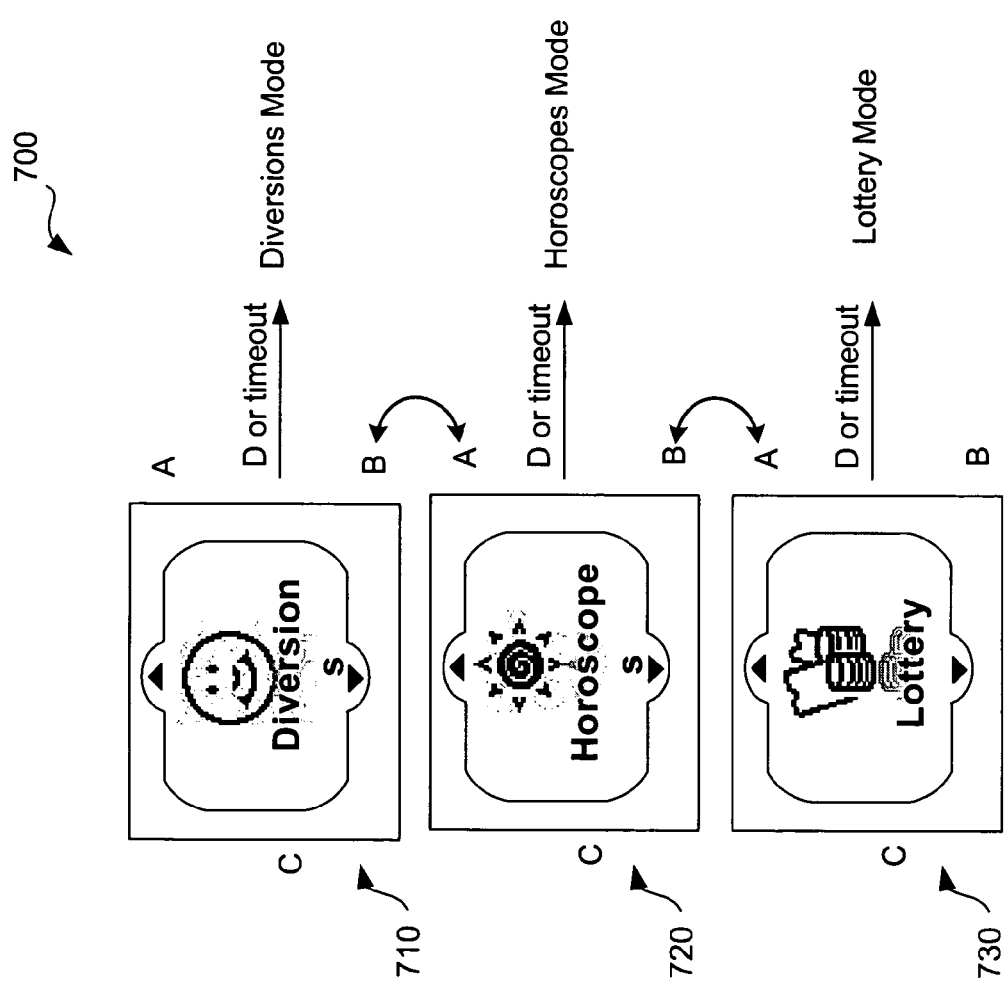
FIG. 7 illustrates exemplary diversion channels.
Figure 8:
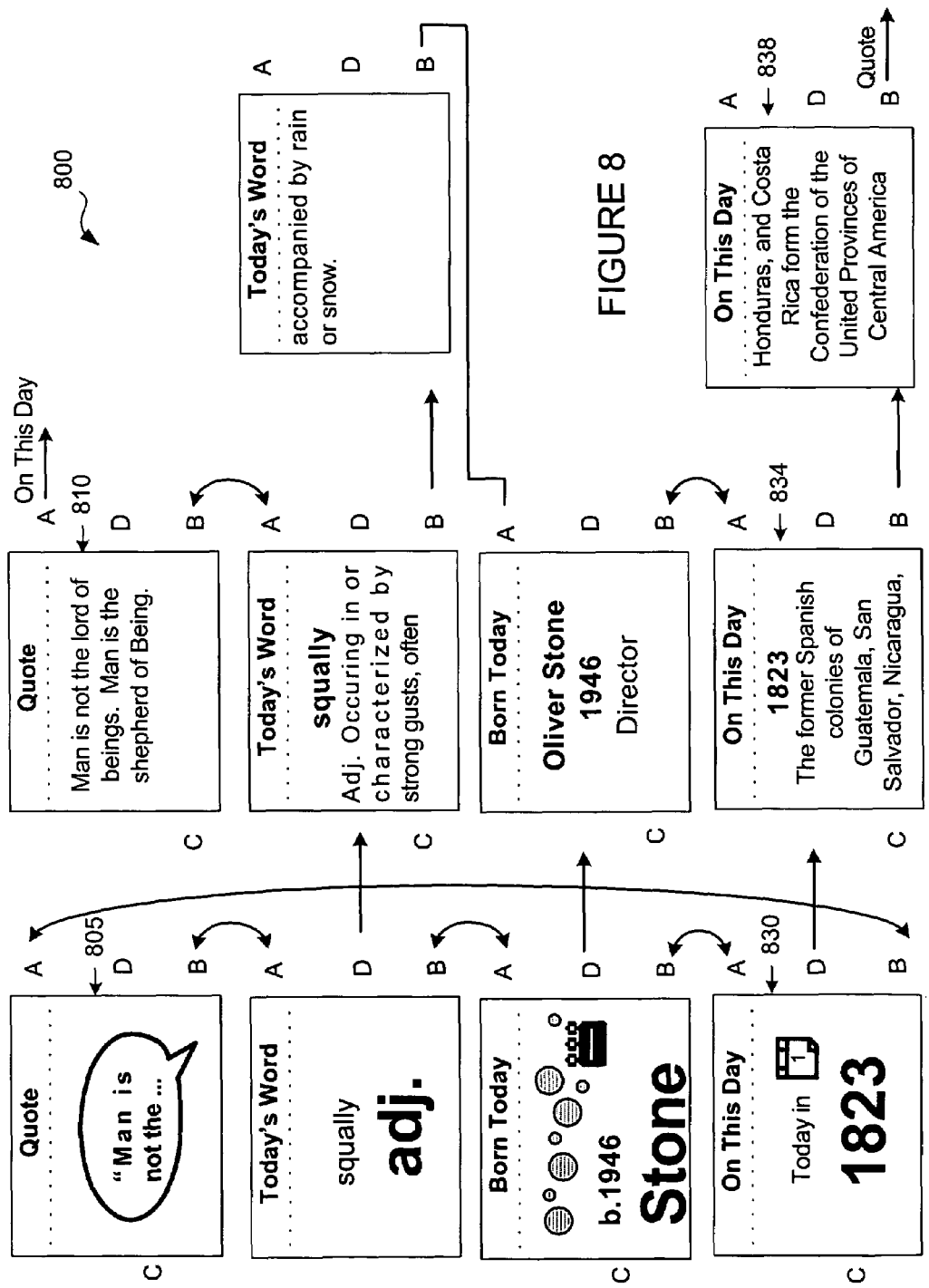
FIG. 8 shows views for a diversion channel.

FIG. 7 illustrates exemplary diversion channels 700, in accordance with aspects of the invention. According to one embodiment, the diversions are divided between three channels: a diversions channel (710); a horoscopes channel (720); and a lottery channel (730).

Diversion channel splash-screen 710 is displayed when the diversion channel is initially selected. After the diversion channel is selected, one of the available views is activated by the expiration of a timeout period (e.g., two seconds) without user interaction, or by activation of the "D" or "enter" selector. The channel splash may also be activated from any one of the mode splash screens by activation of the "C" selector. Generally, the diversion channel includes display views that correspond to selected diversions (See FIGS. 8-9 and related discussion).

When the horoscope channel is activated, horoscope splash screen 720 is displayed. Generally, the horoscope channel includes display views that correspond to selected horoscopes (See FIGS. 10-11 and related discussion).

When the lottery channel is activated, splash screen 730 is displayed. Generally, the lottery channel includes views that correspond to selected lottery games selected by a user. (See FIG. 12-14 and related discussion).

The Daily Diversions Channel

The Daily Diversions channel is designed to offer fin and entertaining distractions during the day. After the user initially configures the diversion channel, diversion content is automatically delivered to his device without the user having to request the content. In other words, the user continually receives new diversion content without specifically having to request the content to be delivered to his device. The daily diversions channel may include many different types of diversion data. For example, the channel may include items such as: This day in history; Born on this day (Name of person, Year of birth or lifespan, Brief information on person (e.g. comedian, actor and writer)); Trivia questions; Puzzle of the day; Mystery person of the day; Did you know?; Quote of the day; Wisdom from Farmer's Almanac; Word of the day; Conversation starters; Fun facts; Joke of the day; Cartoon of the day; News of the weird; Guinness Book of world records Facts/Record Breakers; soap watch: Gossip; Popularity meter (Hollywood celebrities, politicians); Oprah's book list (book recommendations); Darwin's award/Dumbest Criminal; Consumer tips; Daily Survival Tips; Daily Fortune Cookie; Daily challenge/Deed; Do it yourself tips; Cooking tips; and Dieting tips.

According to one embodiment, each of the diversions includes a glance screen and at least one detail screen. For example, referring to FIG. 8, the quote of the day diversion includes glance view 805 and detail view 810. The views are ordered in one circular list. In other words, when the user selects the next button "B" from the last view in the diversion list the first diversion view is displayed. Similarly, when the user selects the previous button "A" while on the first diversion view, the last diversion view is displayed. For items that have many detail items (such as the "On this day diversion" (830)), the "D" button navigates back to the glance view from any of the detail views (834 and 838). Each type of diversion data has an associated glance screen. There may also be multiple glance screens for each type of diversion data. For example, more than one person may be included for the Born on this day diversion.

According to one embodiment, the diversions appear in the following order: Quote of the Day; Word of the Day; Born Today (all items grouped together); and On this Day In History (all items grouped together). When the user has not selected a diversion to be shown on the device then the diversion is not displayed.

If the glance or detail view is shown for a predetermined period of time (e.g. 7 seconds) then the device moves to an auto-glance mode. In the auto-glance mode, the items are cycled, in order, switching to the next item at a predetermined rate (e.g. every 5 seconds).

The "Born Today" diversions entertain users by showing them which famous people were born on this day. The glance view shows the year the person was born and a last name.

The detail view shows the full name of the famous person on one line (if possible). This information is followed by the year that the person was born. A very brief description of the person's significance follows. According to one embodiment, the Born Today diversions expire at midnight local time according to the device. The device then begins to receive the new content that is broadcast for the new day.

The watch holds up to a predetermined number of Born Today diversions items at a time (i.e. 5 items). If there are more than the predetermined number of Born Today diversions, the device may cycle new ones in throughout the day, replacing the oldest with the new item.

The "On This Day" diversion entertains users by informing them of important historical occurrences happened on this day. Each on this day item includes a glance view and at least one detail view.

The glance view includes a calendar graphic and a year. The detail view begins with the year, followed by the text description of the item. According to one embodiment, the "On This Day" items expire at midnight local time according to the device. The expired content disappears at midnight (local time) and is soon replaced with new content for the new day.

The "Quote of the Day" diversion entertains and educates users by enlightening them with a new famous quote each day. According to one embodiment, there is one new quote each day.

The Glance view shows a "quote bubble" with the first few words of the quote. The detail view shows the entire quote.

According to one embodiment, the Quote of the Day diversions do not expire. Instead, they are replaced by the next quote they receive and a new one is broadcast each day.

The "Word of the Day" diversion entertains and educates users by teaching them a new word each day. There is one new word each day.

The Glance View body shows the word and the type of word (i.e. n. for noun, v. for verb, adj. for adjective, adv. for adverb).

The detail view shows the word followed by the type of word and the definition of the word. According to one embodiment, the Word of the Day diversions do not expire. Instead, they are replaced by the next word of the day received (a new one is broadcast each day).

User Interface for Configuring Diversion Channels

Figure 9:
FIG. 9 illustrates a web interface for selecting diversions.

FIG. 9 illustrates a web user interface for inputting user preferences for a daily diversions channel, in accordance with aspects of the invention.

Various options can be selected via a computer type interface such as through an internet based application, a computer based application, or any other reasonable method of accessing and altering configuration information. In one embodiment, a subscriber to diversion channels can access a web page to select or change various features associated with the diversion channels.

Daily diversions may be added/changed by checking the appropriate checkbox next to the desired diversion. In the example illustrated, the user has selected to receive the Word of the Day, the Born on This Day, the Quote of the Day, and the This Day in History diversions.

After the diversion is added, the diversions may be saved using the save button. According to one embodiment, removing (unchecking) all of the diversions and clicking "save" removes the daily diversions channel. In this instance, a configuration message is sent to the device causing the daily diversions channel to be removed from the device.

Daily diversion channel content can also be shown in another channel. According to one embodiment, some daily diversion content may also be displayed in a glance channel which includes information from many different channels. The glance channel is configured to provide the user with highlights from various channels. Once the diversion items are accessed by a user they are no longer displayed in the glance channel. Diversion items are defined as "accessed" when a user has viewed the most recent detail view for that diversion.

Horoscopes Channel

Figure 10:
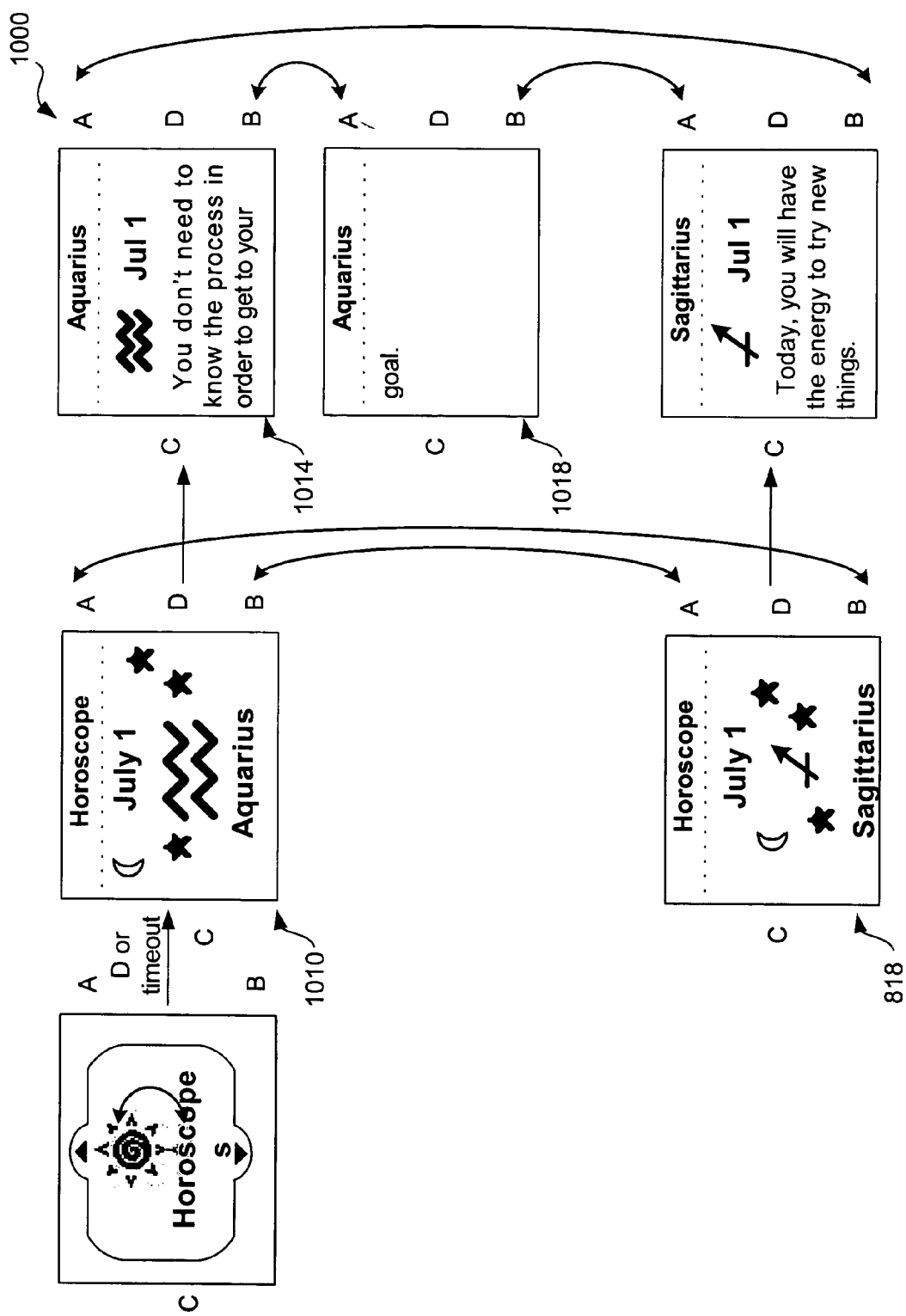
FIG. 10 shows views for a horoscope channel.

FIG. 10 shows views for a horoscope channel, in accordance with aspects of the invention. The Horoscopes channel offers horoscopes each day.

Each of the selected horoscopes includes a glance screen and at least one detail screen. For example, referring to FIG. 10, the Aquarius horoscope includes glance view 1010 and detail views 1014 and 108.

The views are ordered in one circular list. According to one embodiment, the views are ordered by date range that the sign represents. Selecting the "D" button navigates back to the glance view from any of the detail views.

According to one embodiment, the horoscope items do not expire. Instead, when a new horoscope is received the old one is replaced. When the horoscope is the current day's horoscope then stars shown in the glance view appear to twinkle. The stars flash on/off and off at random 0.25 second intervals for 2 seconds. If the Horoscope has not been updated for the current day, then the stars do not flash.

If the view is left on the display for more than a predetermined period of time (i.e. 10 seconds) then the Horoscopes channel switches to auto-glance mode. In this mode, it cycles through all of the items in glance view, in order, switching to the next item every 5 seconds.

The glance view shows the image of the astrological sign among stars and moon. Beneath the images, the name of the sign appears. Above the image is the date of the Horoscope.

The detail view shows a tiny version of the astrological symbol and the name of the sign in the toolbar. The text of the horoscope is beneath it, centered.

The first line of the body shows the astrological sign and the date of the horoscope. The horoscope is then displayed.

Horoscope channel content can also be shown in another channel. According to one embodiment, selected horoscopes are displayed in a glance channel which includes information from many different channels. The glance channel is configured to provide the user with highlights from various channels. Once the horoscopes are accessed by a user they are no longer displayed in the glance channel. Horoscope items are defined as "accessed" when a user has viewed the most recent detail view for that horoscope.

User Interface for Configuring Horoscope Channel

FIG. 11 illustrates a web user interface for inputting user preferences for a horoscope channel, in accordance with aspects of the invention.

Horoscopes may be added/changed by checking the appropriate checkbox next to the desired horoscope. Once the user is satisfied with their horoscope selections, the horoscopes may be saved using the save button. According to one embodiment, removing (unchecking) all of the horoscopes and clicking "save" removes the horoscopes channel. In this instance, a configuration message is sent to the device causing the horoscopes channel to be removed from the device and the user is notified that she has unsubscribed from the channel.

As illustrated, a user can select one or more of the following astrological signs: Aries (Ram): March 21-April 19; Taurus (Bull): April 20-May 20; Gemini (Twins): May 21-June 20; Cancer (Crab): June 21-July 22; Leo (Lion): July 23-August 22; Virgo (Virgin): August 23-September 22; Libra (Scales): September 23-October 22; Scorpio (Scorpion): October 23-November 21; Sagittarius (Archer): November 22-December 21; Capricorn (Goat): December 22-January 19; Aquarius (Water Bearer): January 20-February 18; and Pisces (Fish): February 19-March 20.

Lottery Channel

Figure 12:
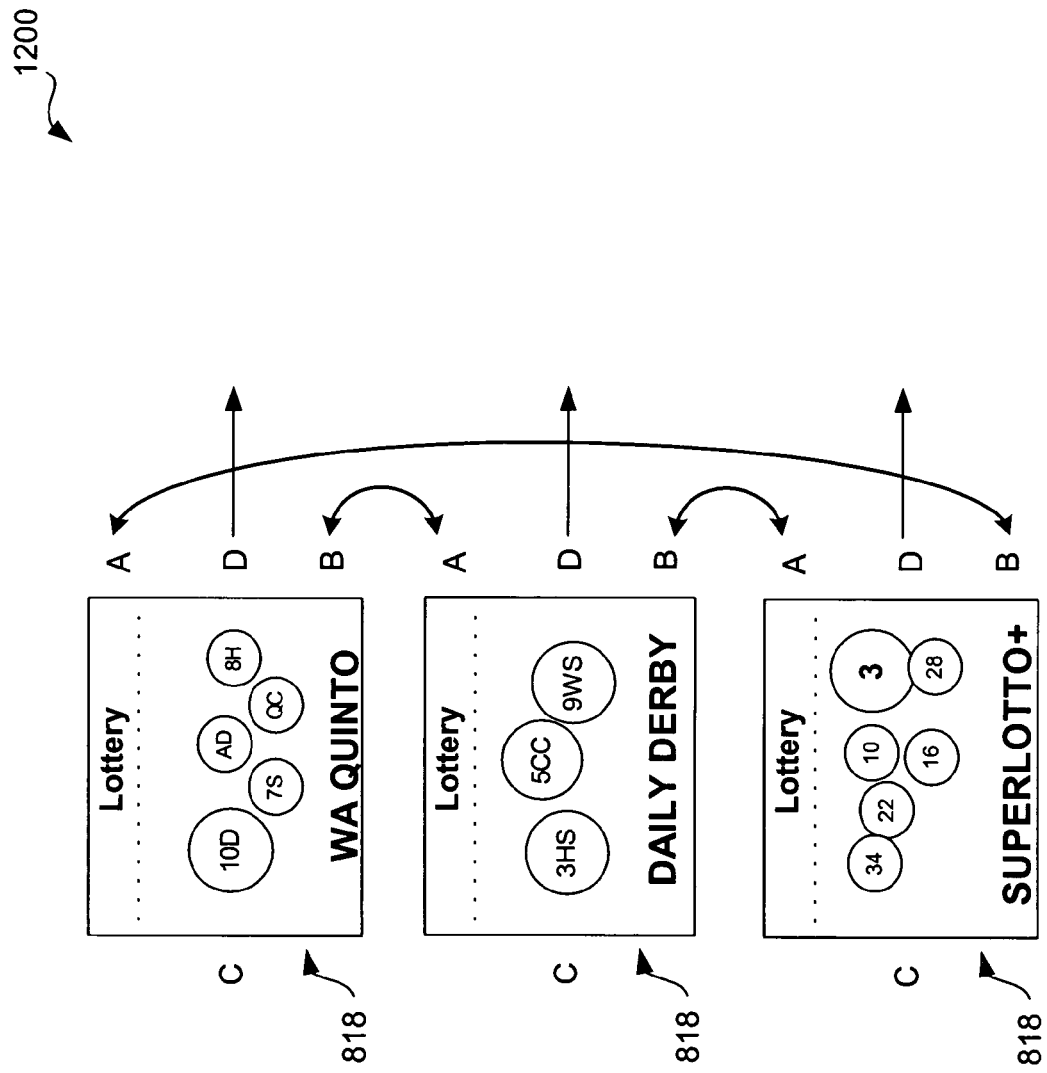
FIG. 12 shows glance views for a lottery channel.
Figure 13:
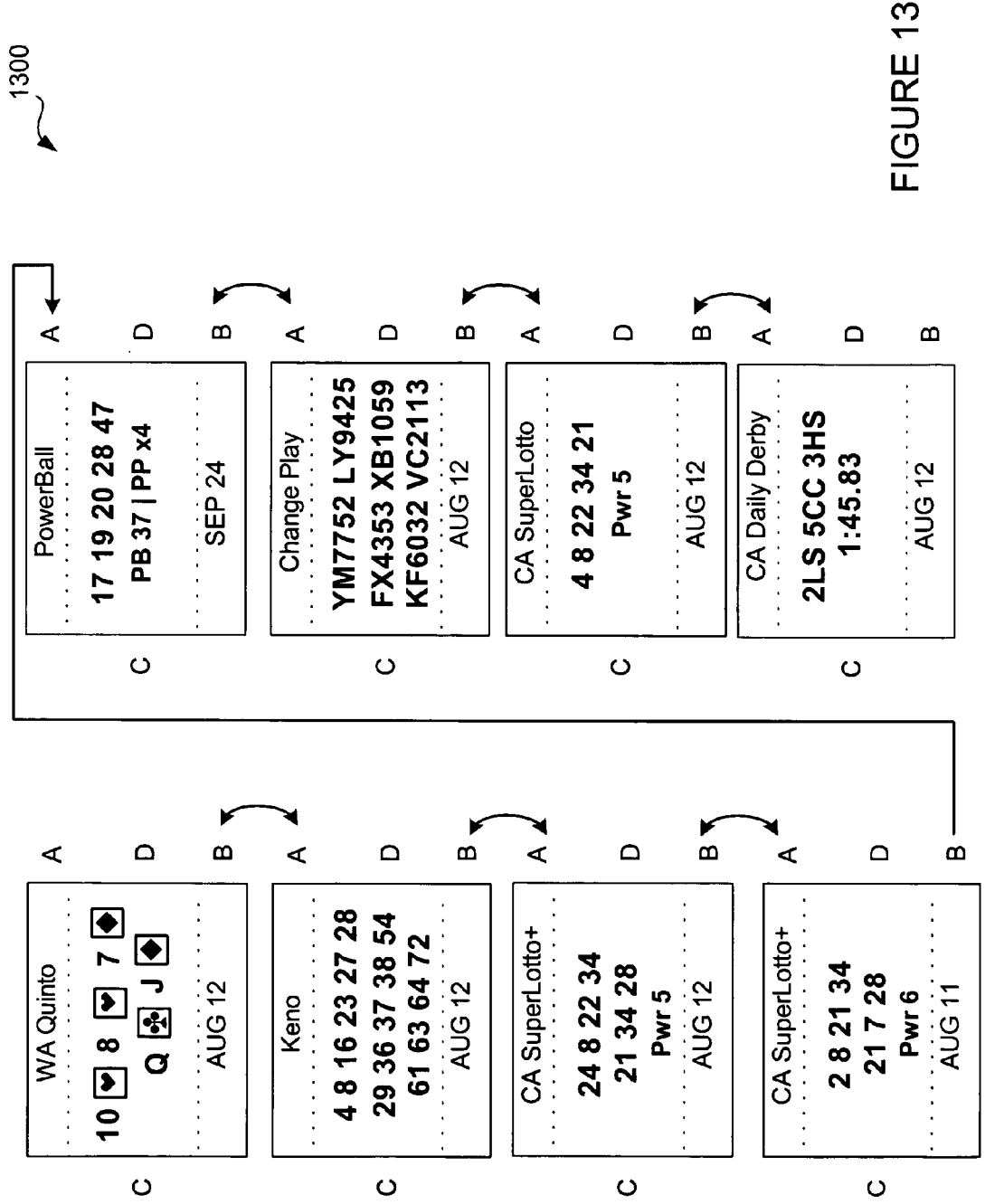
FIG. 13 illustrates detail views for lottery games.
Figure 14:
FIG. 14 shows a web interface for selecting lottery games.

FIGS. 12 and 13 show views for a lottery channel, in accordance with aspects of the invention. The lottery channel is configured to inform users of the most recent lottery numbers for their regional lotteries each day. There is a glance view for each lottery game and at least one detail view which show the results to the most recent game as well as a short history of previous drawings for that game.

The lottery displays are ordered in one circular list. For items that have multiple detail views, the "D" button navigates the user back to the glance view from any of the detail views.

If one of the views remains on the screen for more than a predetermined number of seconds (i.e. 10 seconds), then the lottery channel switches to auto-glance mode. In the auto-glance mode, the device cycles through all of the items in glance view, in order, switching to the next item every 5 seconds.

The lotteries are ordered by the date/time of the most recent drawing for that game. According to one embodiment, the device holds the last three sets of winning numbers for each game. These items are sorted in reverse chronological order (newest first), all in the "detail view" behind the Glance view for that game. When a new lottery item comes in, it replaces the oldest (by drawing date/time) in the queue.

FIG. 12 shows exemplary glance views for a lottery channel, in accordance with aspects of the invention. Each of the glance views shows the first letters/numbers of the most-recently-received results. Referring to the views, the single-digit number/letters are drawn in the large font in large circles and double-digit letters or numbers are drawn in the small font in smaller circles. According to one embodiment, the balls are animated such that they appear to be moving on the display. The name of the lottery game is displayed at the bottom of the view.

FIG. 13 illustrates detail views of the lottery channel, in accordance with aspects of the invention. The detail view of the lottery channel shows the name of the game in the title bar.

The body of the lottery detail views shows the winning numbers and the date of the drawing. The numbers start on the first line and continue to the second line as necessary. Special indications are also included within the screen. For example, Powerball includes both a Bonus Ball and a Power Play multiplier. The Powerball is designated with a "PB" and the Powerplay multiplier with a "PP x."

The device holds a predetermined number of winning numbers per game at a time. According to one embodiment, the device is configured to store the last three results for each of the lottery games delivered to the device. Lottery items are sorted in chronological order by drawing date/time. The newest items are listed first. When the user reaches the last lottery item, she merely proceeds to the next detail view of the next diversion. The list is circular. For instance, when viewing the last item of the last game, pressing "next" will take you to the first item of the first game. Additionally, when navigating backwards, the channel jumps to the most recent results for the previous game and not the oldest results.

Lottery channel content can also be shown in another channel. According to one embodiment, the lottery results are displayed in a glance channel which includes information from many different channels. The glance channel is configured to provide the user with highlights from various channels. Once the lottery items are accessed by a user they are no longer displayed in the glance channel. Lottery items are defined as "accessed" when a user has viewed the most recent detail view for that game.

User Interface for Configuring Lottery Channel

FIG. 11 illustrates a web user interface for inputting user preferences for a lottery channel, in accordance with aspects of the invention.

Lottery games may be added/changed by checking the appropriate checkbox next to the desired lottery game. Once the user is satisfied with their selections, the lottery games may be saved using the save button. According to one embodiment, removing (unchecking) all of the lottery games and clicking "save" removes the lottery channel. In this instance, a configuration message is sent to the device causing the lottery channel to be removed from the device.

The list of games is dynamically generated when a user accesses the site. If a game is played in a state that touches any of the regions that a user is subscribed to (home, commute, etc.), then the game is displayed within the web page allowing the user to track that game. If there are games from more than one state then the state abbreviation is indicated in parenthesis (not shown) after the state name.

According to one embodiment, the user can subscribe to five lotteries. If the user unselects all games on the page and clicks "Save", then this is an implicit Unsubscribe from the lottery channel.

A configuration message is broadcast to the device once the lottery channel is configured. The configuration message includes the selected games and preferences as set using the web user interface. Additionally, a two bit value is sent to the device along with each of the games instructing the device as to how best display the results for the associated game. According to one embodiment, the following is an exemplary encoding: 00: Normal; 011: Lottery has a bonus ball (assumed to be the last number in the list of results); 10; Lottery has a power ball (has a power ball and multiplier); and 11: Lottery is keno or keno-like. These values are then used by the device to display the results the device receives from broadcasts.

Encoding

Figure 15:
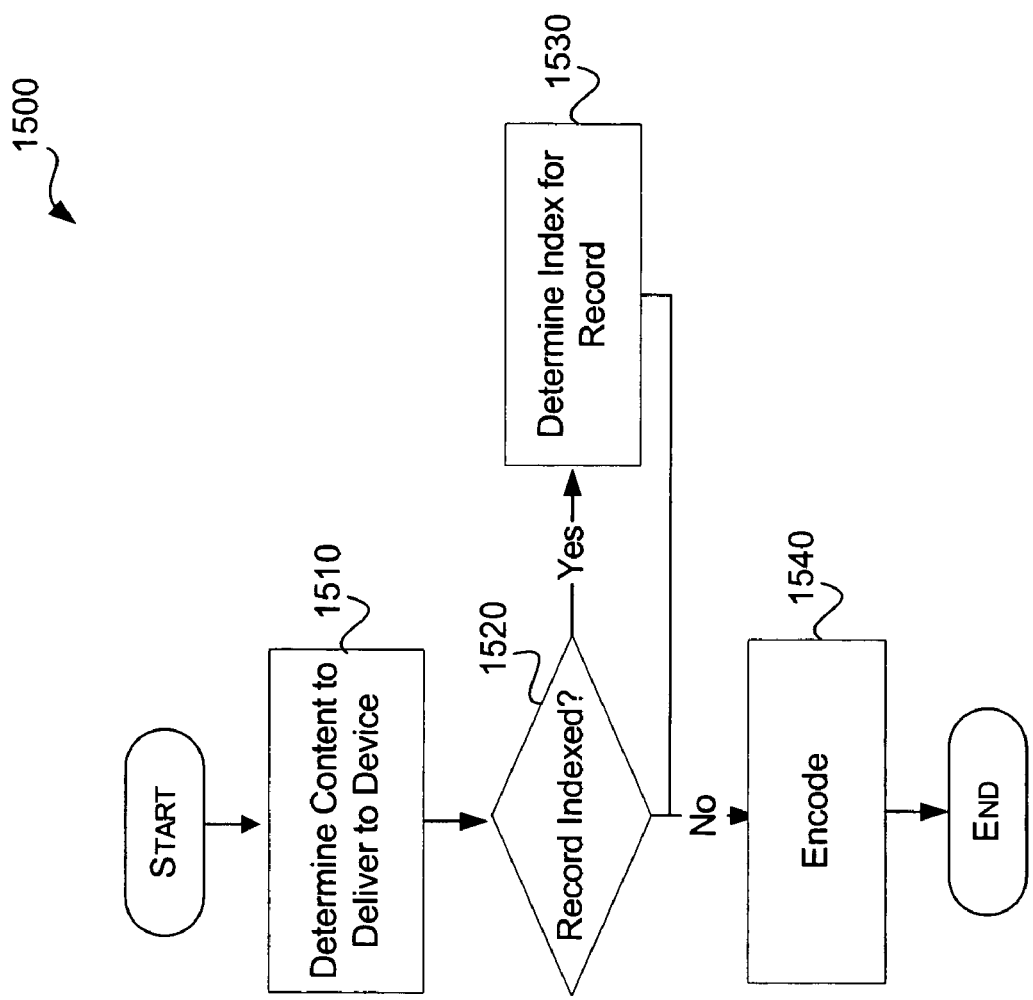
FIG. 15 illustrates encoding diversion data, in accordance with aspects of the present invention.

FIG. 15 illustrates encoding diversion data, in accordance with aspects of the invention. After a start block, the process moves to block 1510 where a determination is made as to what diversion content is going to be delivered to the device.

Moving to decision block 1520, a determination is made as to whether the data record is part of an index. Generally, any information that is static and that is broadcast multiple times is encoded as an index. For example, horoscope astrological signs may be encoded as part of an index, such that each astrological sign name does not need to be delivered to the device each time the sign is referenced. Indexing the content dramatically cuts down the amount of data that needs to be broadcast. The content is indexed by assigning an ID to each name that remains static. According to one embodiment, the index starts at one and ends at the last astrological sign. The sign names and their associated IDs are delivered to the device in a configuration message such that when the device receives a horoscope broadcast the device may associate the ID with the name.

When the record is encoded as an index, the process moves to block 1530, where the index value is determined for the record.

When the record is not encoded as an index, the process moves to block 1540, where the record is encoded. According to one embodiment, the value of the record is stored within a predetermined number of bits. For example, a year may be encoded in x number of bits whereas a description may encoded in more bits.

Operating Environment

FIG. 1 illustrates an example operating environment for the present invention. As illustrated, operating environment 100 includes wireless transmitter 120 that is responsible for delivering content to wireless devices. According to one embodiment, the wireless transmitter may include a cellular tower that is used to communicate with mobile devices, such as cell phones, notebooks, pocket PCs, long-distance communication links, and the like. According to another embodiment, the wireless transmitter may include an FM transceiver that broadcasts signals over communication channel 110 to the various electronic devices. The FM broadcast may be any number of types including but not limited to: a standard FM transmission, a sub-carrier FM transmission, or any other type of FM transmission as may be desired. Example electronic devices that have an FM receiver or transceiver may include a desktop computer, a watch, a portable computer, a wireless cellular telephone (cell phone), and a personal data assistant (PDA). The electronic devices are arranged to receive information from the wireless broadcast.

Some example electronic devices that may include an electronic system arranged to operate according to the interaction model are illustrated in FIG. 1. Each of the electronic systems receives messages/information over the communication channel.

According to one embodiment, each broadcast transmission corresponds to the transmission of one or more frames. Each frame may include multiple messages, where some messages are public broadcast (aka "global" or "shared" messages), while other messages are client specific messages (aka "personal" or "private" messages). Every client that is located within the designated service region may receive shared messages, while a single client may decode a private message.

Electronic devices (e.g., a wireless watch device) receive message packets according to shared and private messages that are directed to the client device. Message packets are organized in groups according to logical slot (or channel) entry numbers. For example, a particular electronic device is configured to receive a selected group of channels from the available channels. The message packets associated with each of those channels is received, processed, and stored in the client device. The stored message packets can be reviewed using a user interface that employs an interaction model, in accordance with the present invention.

Example channels include: diversion channels (lottery, horoscope, daily diversions), a sports channel, a time channel, a messages channel, a calendar channel, a stocks channel, a news channel, and a movies channel. Messages associated with each channel include message content that is based on the particulars of the channel. For example, the lottery channel may include lottery information whereas a horoscope channel may include horoscope information.

FIG. 2 is a schematic diagram illustrating functional components of an illustrative electronic device that may be used to interact with channel content, in accordance with aspects of the invention. Electronic device 200 includes processor 260, memory 262, display 228, and user interface 232. Memory 262 generally includes both volatile memory (e.g., RAM) and non-volatile memory (e.g., ROM, Flash Memory, or the like). Electronic device 200 may include an operating system 264, such as the Windows CE operating system from Microsoft Corporation or another operating system, which is resident in memory 262 and executes on processor 260. User interface 232 may be a series of push buttons, a scroll wheel, a numeric dialing pad (such as on a typical telephone), or another type of user interface means. Display 228 may be a liquid crystal display, or any other type of display commonly used in electronic devices. In one example, display 228 may be touch-sensitive that would act as an input device.

One or more application programs 266 are loaded into memory 262 and run on the device. Examples of application programs include lottery programs, horoscope programs, sports programs, calendar programs, movie programs, time programs, and so forth. Electronic device 200 also includes non-volatile storage 268 that is located within memory 262. Non-volatile storage 268 may be used to store persistent information which should not be lost if electronic device 200 is powered down. Applications 266 may use and store information in storage 268, such as diversion content used by a lottery application, a horoscope application, and a daily diversions application, appointment information used by a calendar program, and the like.

Electronic device 200 includes power supply 270, which may be implemented as one or more batteries. Power supply 270 might further include an external power source, such as an AC adapter or a powered docking cradle that supplements or recharges the batteries.

Electronic device 200 is also shown with two types of external notification mechanisms: LED 240 and audio interface 274. These devices may be directly coupled to power supply 270 so that when activated, they remain on for a duration dictated by the notification mechanism even though processor 260 and other components might shut down to conserve battery power. LED 240 may be programmed to remain on indefinitely until the user takes action to indicate the powered-on status of the device. Audio interface 274 is used to provide audible signals to and receive audible signals from the user. For example, audio interface 274 may be coupled to a speaker for providing audible output and to a microphone for receiving audible input, such as to facilitate a telephone conversation, or as a user interface using voice recognition. In another example, a vibration device (not shown) can be used to give feedback to the user such as for alerting the user of a newly arrived content. Electronic device 200 can control each alert mechanism separately (e.g., audio, vibration, as well as visual cues).

Electronic device 200 also includes a communication connection, such as radio interface layer 272, which performs the function of receiving and/or transmitting radio frequency communications. Radio interface layer 272 facilitates wireless connectivity for electronic device 200. Transmissions to and from radio interface layer 272 are conducted under control of the operating system 264. In other words, communications received by radio interface layer 272 may be disseminated to application programs 266.

"Computer readable media" can be any available media that can be accessed by client/server devices. By way of example, and not limitation, computer readable media may comprise computer storage media and communication media. Computer storage media includes volatile and non-volatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by client/server devices. Communication media typically embodies computer readable instructions, data structures, program modules or other data in a modulated data signal such as a carrier wave or other transport mechanism and includes any information delivery media.

The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above are included within the scope of computer readable media.

In one example of the present invention, electronic device 200 is a mobile electronic device such as a watch device that includes a wireless interface. An exemplary watch device is shown in FIG. 3.

Broadcast Channels

Figure 4:
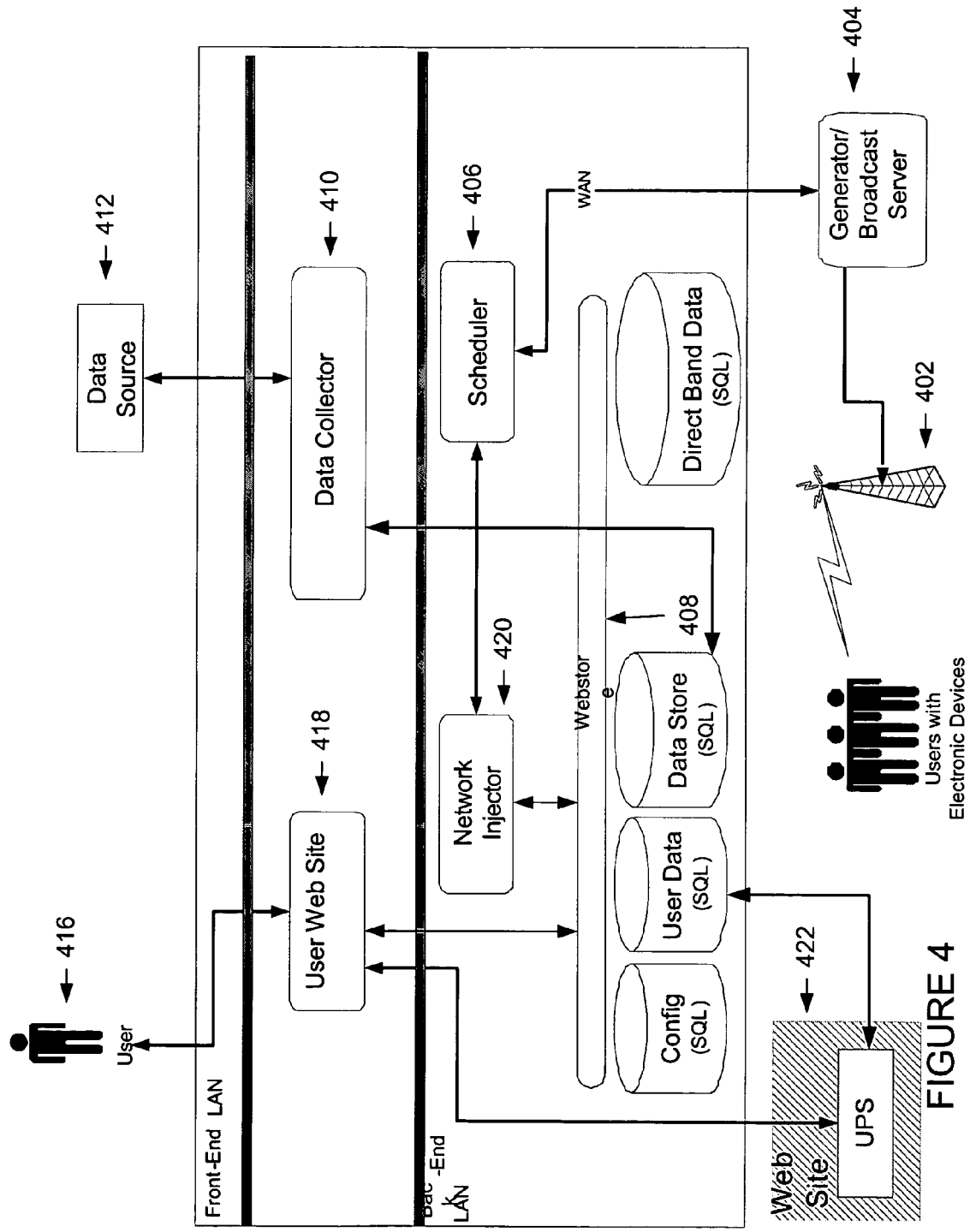
FIG. 4 illustrates a system for delivering and configuring channel information to an electronic device.

FIG. 4 illustrates a system for delivering and configuring channel information to an electronic device, in accordance with aspects of the invention.

A user, such as user 416, may customize their channels through user web site 418. Using website 418 the user may set options and select information associated with channels to which they have subscribed. For example, the user may select the lottery games they desire to receive using website 418. The selected options are stored in a data store, such as webstore 408. Channel information and various options may also be automatically retrieved from a web site to which the user participates in. For example, web site 422 may be the user's home page in which the user has already selected various options customizing their page. These options may be used to populate the options associated with various channels. For example, a user's selected horoscopes may be used in a horoscopes channel, the user's selected lottery games may be used in a lottery channel, a user's selected stocks they desire to track may be used in a stock channel, and the like.

Data Collector 410 is configured to collect data from one or more data sources, such as data source 412, relating to a channel. For example data collector 410 may retrieve daily diversion content from one data source, lottery content from another source, and horoscope content from another data source. According to one embodiment, the diversion content for the diversion channel is obtained from files that may or may not be updated periodically. Lottery channel content is obtained from a live feed such that the results are up to date.

According to one embodiment, the Word of the Day and Quote of the Day content is obtained from flat files and randomly chosen. The Born On This Day and the On this day content may be obtained from flat files.

Because this data is date-sensitive but not particularly time-sensitive, these items are sent with higher priority very early in the morning (i.e. midnight-5 AM) and with much lower priority during the day, to make room in the broadcast bandwidth for time-sensitive items such as stock prices, news items, and sports scores.

The data obtained varies depending on the diversion content that is delivered to the device. After the data is obtained, the data is encoded and then sent to the device. The data collected by data collector 410 may be stored in a data store, such as webstore 408, for later broadcast.

The lottery feed is a live feed that regularly sends out updates as new game results come in. Some lottery games happen mid-day while others are later in the evening. Therefore, lottery updates are broadcast as they occur. The lottery feed is location-sensitive. In other words, only the lottery games within a broadcast area are delivered to the device. The device may then select from the broadcast which games it is interested in receiving.

Broadcast transmitter tower 402 is arranged to provide a communication signal that is configured for reception by users with electronic devices that are located within a service region. Broadcast tower 402 transmits in response to generator/broadcast server 404. Generator 404 may communicate with scheduler 406 via a network communication link. Scheduler 406 is configured to schedule broadcast transmissions relating to channel information.

Selected services are entered in a database, such as webstore 408 for broadcast transmission at a later time. At the designated time (or time interval) scheduler 406 communicates with broadcast server 404 to begin a transmission sequence of data for the selected services. Broadcast server 404 converts the data to the appropriate format for transmission (i.e. an FM signal) and relays it to broadcast tower 402. In an alternative example, scheduler 406 communicates the selected services to the broadcast server. The broadcast server schedules the time interval for transmission of the selected service.

Each broadcast transmission corresponds to the transmission of one or more frames that are arranged in accordance with a frame protocol. Each frame may include multiple messages, where some messages are public broadcast (aka "global" or "shared" messages), while other messages are client specific messages (aka "personal" or "private" messages). Each frame includes a table of contents that indicates the extent of messages that are found within the next transmitted frame. Every client that is located within the designated service region receives the shared and personal messages. Personal messages, however, may only be decoded by a single client.

Each frame includes a header, a table of contents, and a message payload that includes the content for one or more selected services as previously described. The header also includes other information such as authentication data, identified service region, language, available stations for the identified service region, frame number, and time stamp. Control information may also be included in one of the headers to indicate broadcast conditions such as a change in available channels, an assignment of a service region to a particular wireless client device, and an assignment of a particular channel (frequency). In one example, each frame includes a change counter in one of the headers to indicate a change has taken place in the system. Wireless client devices (clients) may use the change counter to determine when to initiate a failover (when a broadcast tower becomes unavailable).

Client devices can determine the current service region based on information that is included in the broadcast transmissions. The time zone can be determined based on the current service region such that the client device can adjust any time related information. Moreover, the time and date functions of the client device may be synchronized based on information that is included in the broadcast transmissions.

Some data changes fairly rarely and therefore may be sent by broadcast server 404 as part of the configuration of the diversion channels on the electronic device. For example, the electronic device may store a name and corresponding ID of the name such that when it receives a broadcast transmission the device may match the ID with the name. According to one embodiment, a stream of names is broadcast at predetermined intervals. When a device needs a name, the name is accessed within the stream by an index value. According to another embodiment, whenever a name changes a configuration message is prepared and sent to users who have selected that team.

Process Flow

Figure 5A:
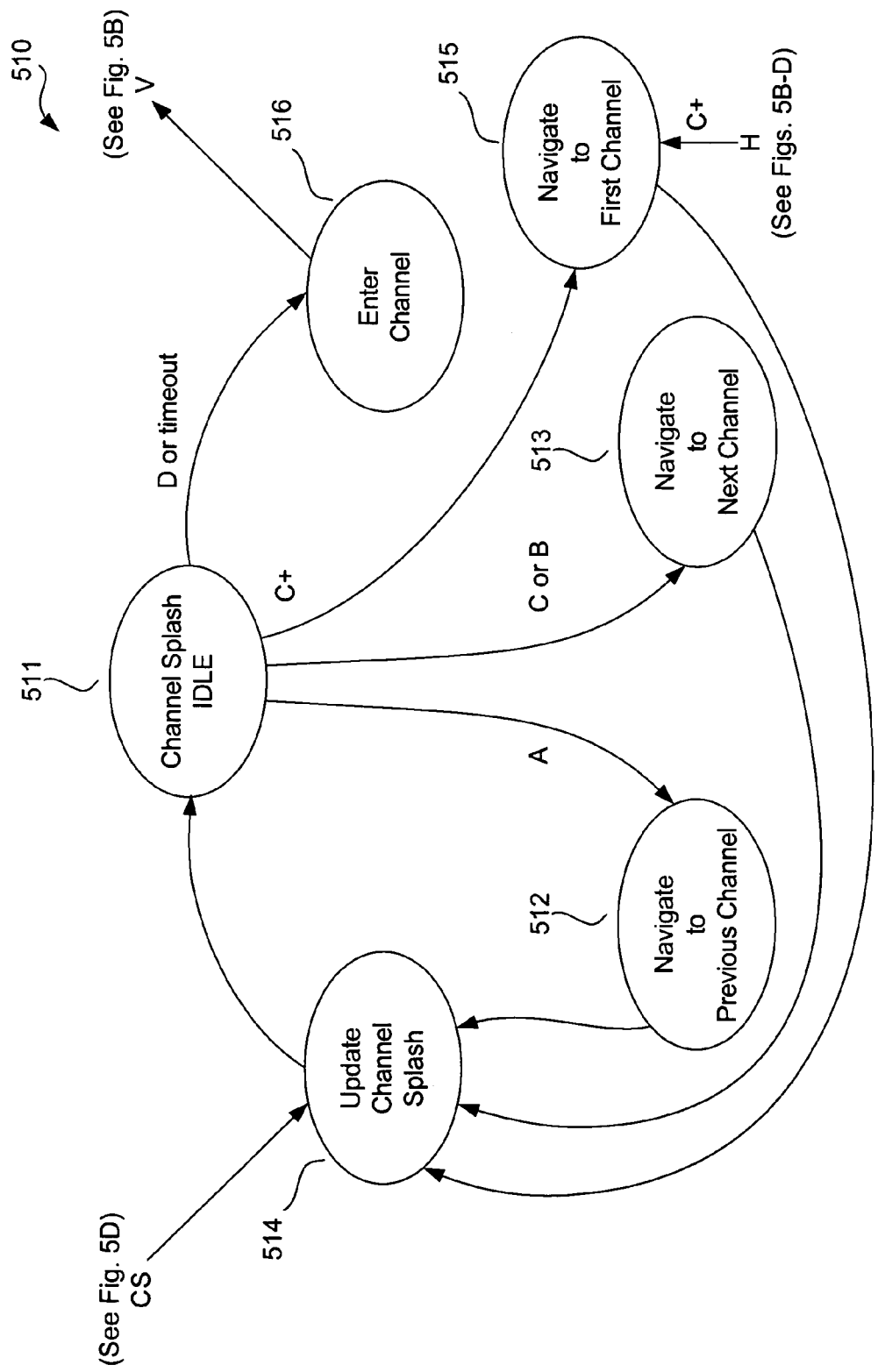
FIGS. 5A-5D illustrate process flows for passive and active navigation functions of a electronic device.
Figure 5B:
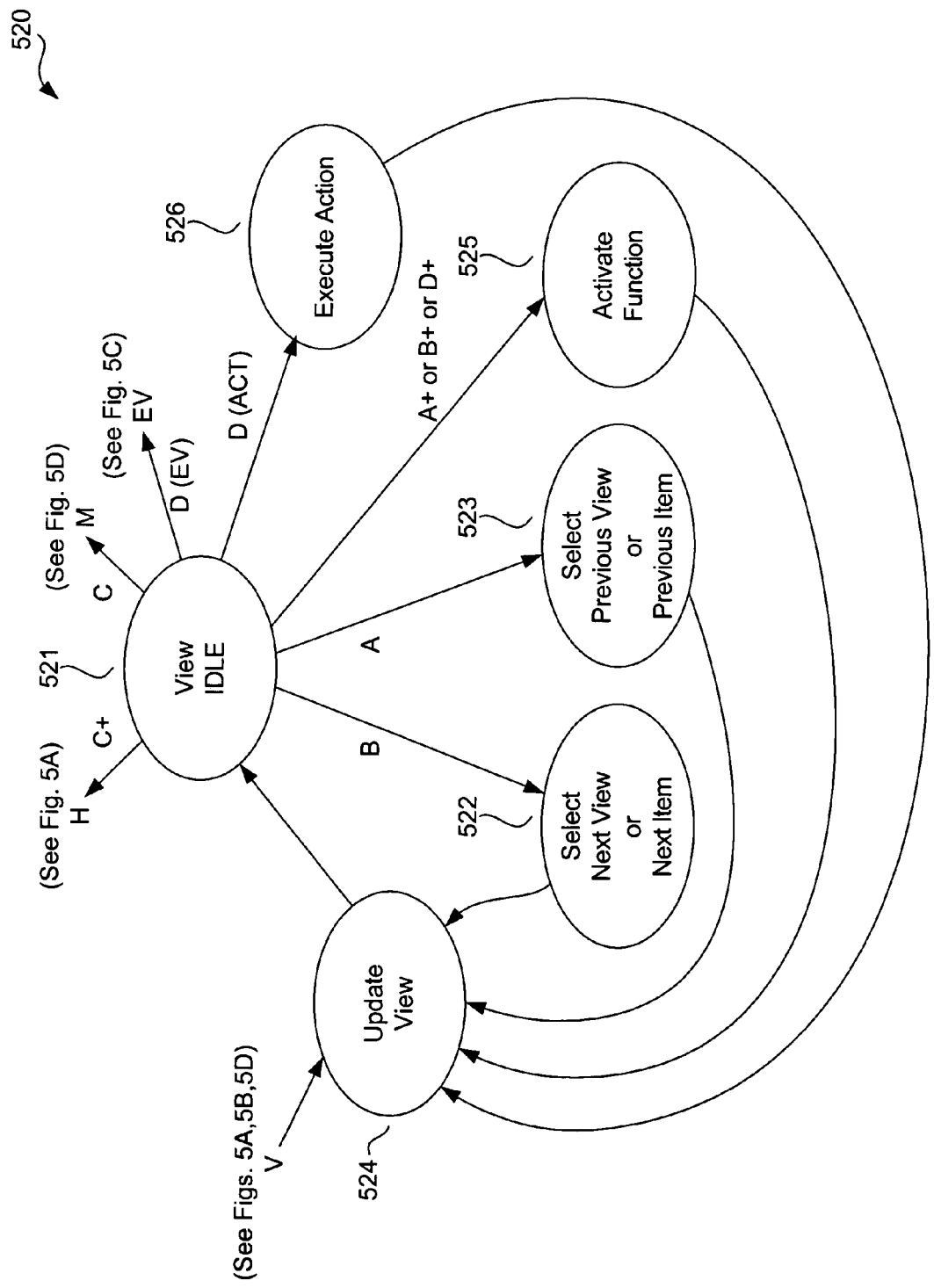
Figure 5C:
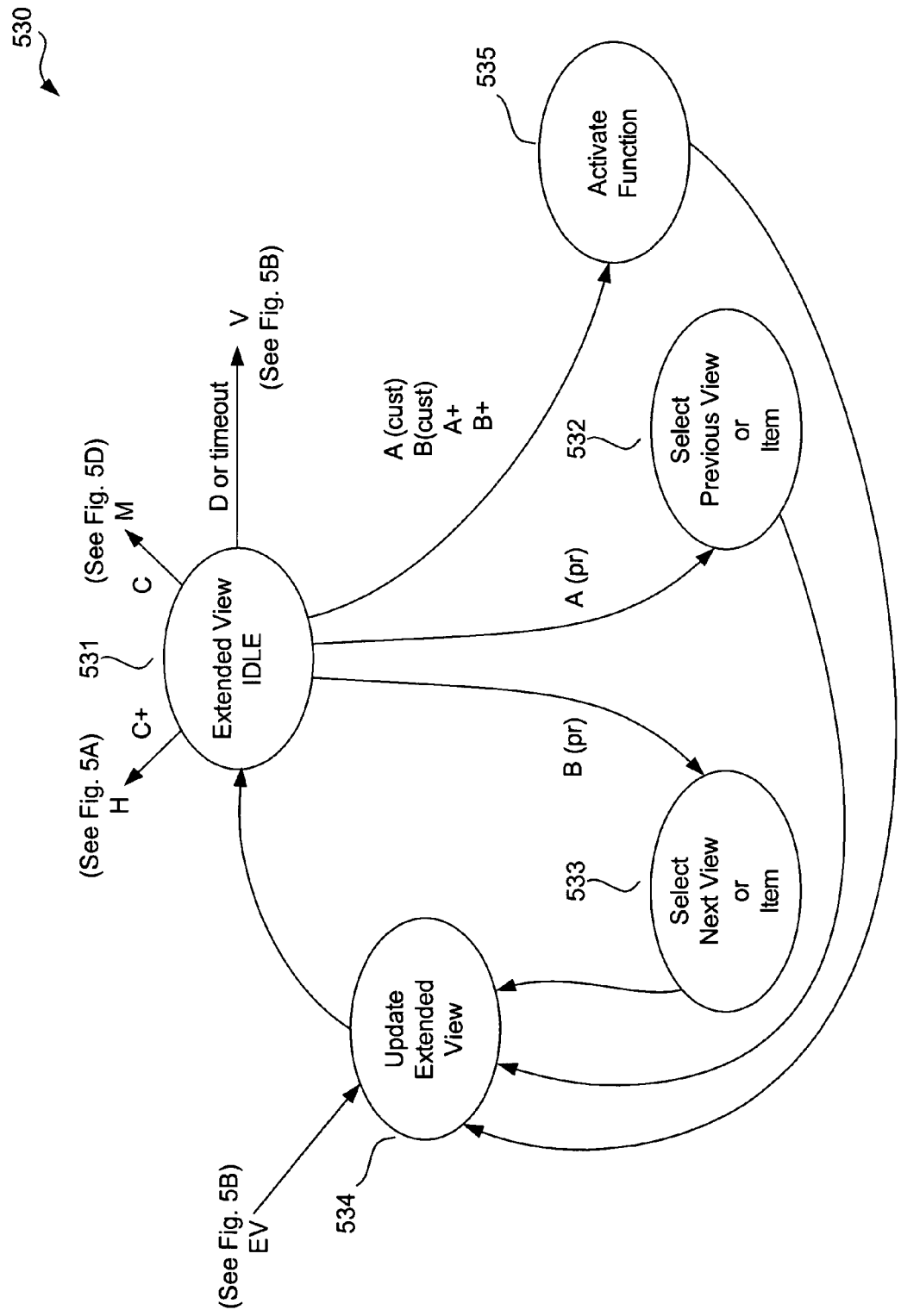
Figure 5D:
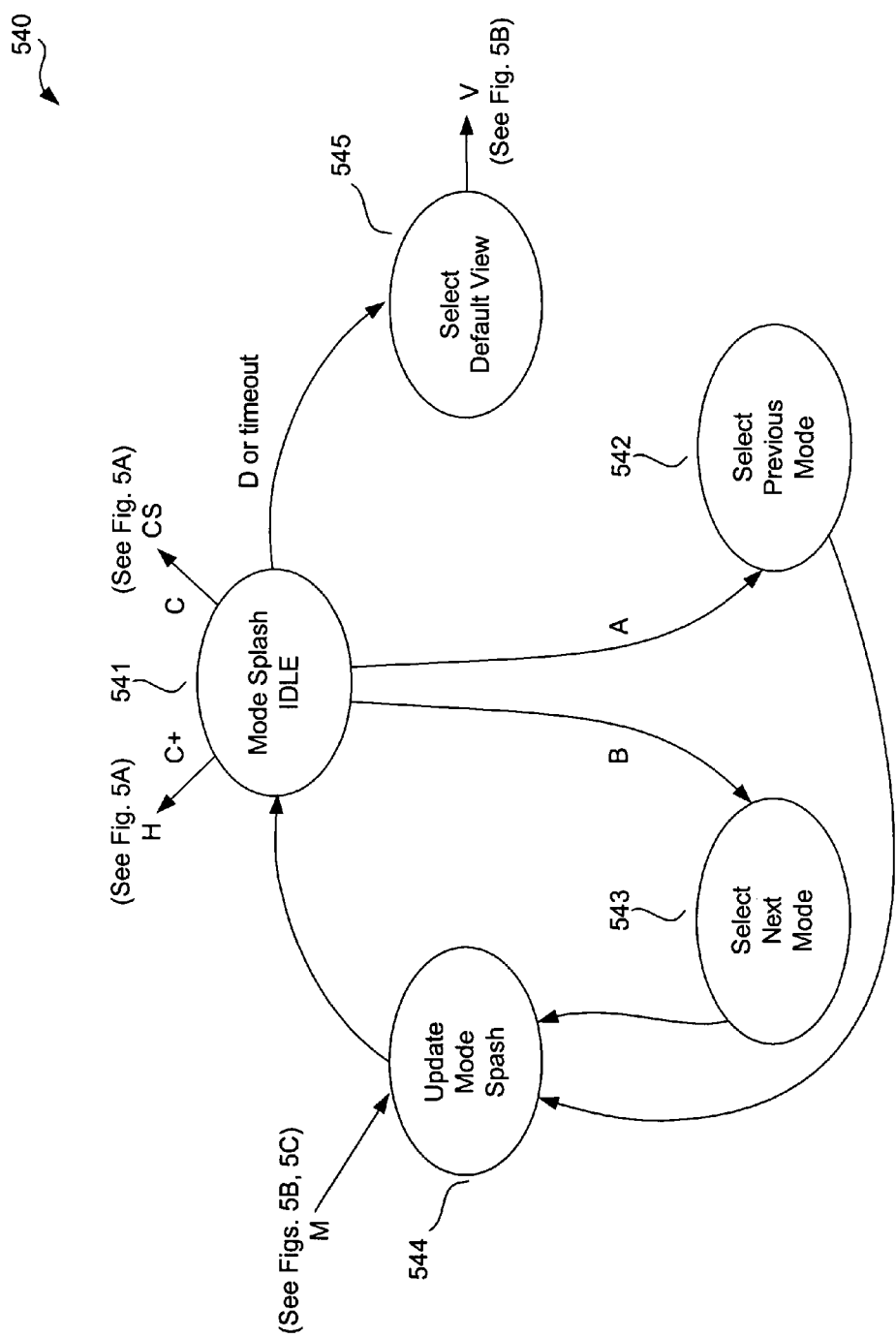

Process flow diagrams for navigation function of an example electronic device are illustrated in FIGS. 5A-5D. The process flow diagram illustrated in FIG. 5A is predominately focused on channel splash activity. The process flow diagram illustrated in FIG. 5B is predominately focused on view activity. The process flow diagram illustrated in FIG. 5C is predominately focused on extended view activity. The process flow diagram illustrated in FIG. 5D is predominately focused on mode splash activity.

Every electronic device has at least one channel that corresponds to the home channel. For a watch type of device, the home channel corresponds to a time channel. However, different home channels can be assigned to every electronic device. Whenever the currently selected channel corresponds to the home channel, the previous channel corresponds to the last channel (if more than one channel exists on the device). Similarly, the next channel corresponds to the home channel when the current channel is the last channel in the channel list for the electronic device.

Every electronic device has a set of selectors (or buttons) that are selectively activated to navigate various functions in the device. Example selectors are illustrated in FIG. 3. For the purposes of the discussion below, each selector is indicated by a letter such as "A", "B", "C", "D", and "E". Some alternate selector functions may be chosen by sustained activation of a selector button for a predetermined time interval (e.g., two seconds). The alternate selector functions are generally indicated in the figures by a "+" symbol that is adjacent to the selector functions' designating letter (e.g., "C+").

The example electronic device described below includes at least four selectors as indicated by letters "A", "B", "C", and "D". The "E" selector may be arranged to provide additional functions such as backlighting, a back channel selector, as well as any other desired function. Additional extended functions may also be programmed and accessible through multiple selector combinations. For example, one function could be selected by holding the "D" and "A" selectors together ("D+" & "A+") for a predetermined time interval. Additional extended functions can also be programmed using other selector combinations such as "D+" & "B+", "A+" & "B+", as well as others.

Channel Splash Operating State

The channel splash operating state is described as follows below with reference to FIG. 5A.

The electronic device has a default initial channel that is referred to as a home channel. The display is updated to indicate the currently selected channel at block 514. Processing continues to block 511 where the channel splash operating state is maintained in an idle state. The electronic system in the electronic device monitors the user interface (e.g., the four selectors) while in the channel splash IDLE state. Processing leaves the channel splash IDLE state when the user activates one or more of the selectors or a timeout has occurred. The display actively maintains the splash screen to indicate the current channel selection while the channel splash IDLE state is active at block 511. Splash screens may include one or more graphic elements and/or text elements. An example channel splash screen for a diversion channel is illustrated in FIG. 7. Splash screens may be accompanied by the activation of sound that provides an audible indicator that the channel has changed. The sound associated with the audible indicators may be the same for each channel splash screen, or unique based on either the particular channel or the particular channel type (e.g., news channels are one type, while messages are another type).

Processing flows from channel splash IDLE state 511 to the "navigate up" or "navigate to previous channel" function 512 when the "A" selector is activated. Processing continues from block 512 to block 514, where the display is updated based on the newly selected channel. After the display is updated, processing returns to channel splash IDLE state 511.

Processing flows from channel splash IDLE state 511 to the "navigate down" or "navigate to next channel" function 513 when either the "B" selector or the "C" selector is activated. Processing continues from block 513 to block 514, where the display is updated based on the newly selected channel. After the display is updated, processing again returns to channel splash IDLE state 511.

Processing flows from channel splash IDLE state 511 to the "navigate to first channel" or "navigate to home channel" function 515 when the "C+" selector is activated. The home channel navigation function can be accessed from any channel of the electronic device. The electronic device navigates to the home channel (e.g., the time channel on a watch device) when the "navigate to home channel" function is activated. Processing continues from block 513 to block 514, where the display is updated based on the newly selected channel (i.e., the home channel). After the display is updated, processing again returns to channel splash IDLE state 511.

Processing flows from the channel splash IDLE state 511 to the "enter channel" function 516 when the "D" selector is activated. Alternatively, the "enter channel" function is activated when the electronic system is maintained in the channel splash IDLE state for a predetermined time interval (e.g., a 2 second timeout) without activation of a selector. Processing flows from block 516 to block 524 (see FIG. 5B) when the "enter channel" function is activated as indicated by "V".

The enter channel function performs a series of initializations in the electronic device prior to leaving the channel splash operating state and entering the channel view operating state. Every channel in the electronic device has at least one operating mode. The electronic device selects the current operating mode as a default mode, and a current view as a default view in the currently selected channel when the "enter channel" function is activated.

Channel View Operating State

The channel view operating state is described as follows below with reference to FIG. 5B.

The electronic device enters the channel view operating state at entry point V, where the selector functions associated with the currently selected channel and operating mode are mapped to the selectors. The display is updated to indicate the currently selected view at block 524. Processing continues to block 521 where the channel view operating state is maintained in an IDLE state. The electronic system in the electronic device monitors the user interface (e.g., the four selectors) while in the view IDLE state. When the user activates one or more of the four selectors, processing leaves the view IDLE state.

The display actively maintains the current view while the view IDLE state is active at block 521. List type views include lists of items that can be selected. Other types of views are simply graphical and/or textual elements that are arranged in a display view. Views may be accompanied by the activation of sound that provides an audible indicator that the view has changed. The sound associated with the audible indicators may be the same for each view (e.g., a beep type of indicator or sound clip), or unique based on the particular view. In one example, an audible indicator is activated when a particular alert notification function is activated.

Processing flows from the view IDLE state 521 to the "previous view" or "previous item" function 522 when the "A" button selector is activated. Processing continues from block 522 to block 524, where the display is updated based on the newly selected view. After the display is updated, processing returns to view IDLE state 521. In one example, the previous view corresponds to the last view when the currently selected view is the first available view in the current mode for the current channel. In another example, the previous view corresponds to an empty view (e.g., "no diversions", "no data", etc.) when the currently selected view is the first available view in the current mode for the current channel. In still another example, the previous item in a list is highlighted when the "A" selector is activated.

Processing flows from view IDLE state 521 to the "next view" or "next item" function 513 when the "B" selector is activated. Processing continues from block 523 to block 524, where the display is updated based on the newly selected view. After the display is updated, processing again returns to view IDLE state 521. In one example, the next view corresponds to the first view when the currently selected view is the last available view in the current mode for the current channel. In another example, the next view corresponds to an empty view when the currently selected view is the last available view in the current mode for the current channel. In still another example, the next item in a list is highlighted when the "B" selector is activated.

Processing flows from view IDLE state 521 to the "mode splash" function when the "C" selector (e.g., "mode select") is activated as indicated by "M". Refer to FIG. 5D and related discussion for details.

Processing flows from view IDLE state 521 to the select home channel splash function when the "C+" selector is activated as indicated by "H". Refer to FIG. 5A and related discussion for details.

The "D" selector is defined within the context of the current channel, mode, and view. The "D" selector may be defined as a "delete" function, and "enter extended view" function, a "select" function, or an "execute action" function. Not every view in a given channel/mode has an extended view as may be indicated by a null value. Some views may have an action function that is defined within the context of the view in the currently selected mode/channel. The context for each view is assigned to the mode upon entry into the mode for the current channel.

Processing flows from the view IDLE state 521 to the "enter extended view" function when the "D" selector is activated and the extended view is available as indicated by "D(EV)". The extended view is available when defined within the context of the currently selected view. For example, the extended view may be available for a list type view such that the highlighted list item is selected when the "D" selector is activated, and a detailed view associated with the highlighted item is displayed as an extended view. Refer to FIG. 5C and related discussion for details on the extended view processing.

Processing flows from view IDLE state 521 to the "execute action" function at block 526 when the "D" selector is activated and the action function is available as indicated by "D(ACT)". The action function is defined within the context of the currently selected view. For example, a fortune cookie mode may be available in an entertainment channel. Although the fortune cookie mode may only have a single view, the "D" selector may be mapped to an action function that randomly selects fortunes from a list when the "D" selector is activated. After the action is performed (e.g., retrieve random fortune from list, execute an animation sequence), processing continues to block 524 where the display is updated as previously described.

Other special functions may be mapped to the "A+", "B+", and "D+" selectors within the context of the current view. By activating the corresponding selector for a predetermined time interval (e.g., 2 seconds) the corresponding special function is activated as indicated by block 525. Processing continues from block 525 to block 524 where the display is updated as previously described.

In one example, a list browser function is available in a mode that corresponds to news stories. For this example, activation of the "A" and "B" selectors result in manual navigation through views that correspond to previous or subsequent stories. Activation of the "A+" or "B+" selector may activate a speed browse function.

In another example, a delete function is available in a view that corresponds to a specific diversion. Activation of the "D+" selector may activate a delete function that removes the currently selected diversion from the electronic device.

In still another example, processing may flow from view IDLE state 521 to an "alternate view" function when the electronic system is maintained in the channel splash IDLE state for a predetermined time interval (e.g., a 2 second timeout) without activation of a selector. For example, no action for a predetermined amount of time may result in views associated with the channel automatically rotating to other views associated with the channel.

Extended View Operating State

The extended view operating state is described as follows below with reference to FIG. 5C.

The electronic device enters the extended view operating state at entry point EV, where the selector functions associated with the currently selected extended view are mapped to the selectors. The display is updated to indicate the currently selected extended view at block 534. Processing continues to block 531 where the extended view operating state is maintained in an IDLE state. The electronic system in the electronic device monitors the user interface (e.g., the four selectors) while in the extended view IDLE state. When the user activates one or more of the four selectors, processing leaves the extended view IDLE state.

The display actively maintains the current extended view while the extended view IDLE state is active at block 531. Extended views include graphical and/or textual elements that are arranged in a display view. Extended views may be accompanied by the activation of sound that provides an audible indicator that the extended view has changed. The sound associated with the audible indicators may be the same for each extended view (e.g., a beep type of indicator or sound clip), or unique based on the particular extended view.

Processing flows from extended view IDLE state 531 to the "previous view" or "previous item" function 532 when the "A" selector is activated. Processing continues from block 532 to block 534, where the display is updated based on the newly selected extended view. After the display is updated, processing returns to extended view IDLE state 531. In one example, the previous view corresponds to the last extended view when the currently selected extended view is the first available extended view for the current channel/mode. In another example, the previous extended view corresponds to an empty view (e.g., "no appointments", "no events", "no data", etc.) when the currently selected extended view is the first available extended view in the current channel/mode.

Processing flows from extended view IDLE state 531 to the "next view" or "next item" function 533 when the "B" selector is activated. Processing continues from block 533 to block 534, where the display is updated based on the newly selected extended view. After the display is updated, processing returns to the extended view IDLE state 531. In one example, the next view corresponds to the first extended view when the currently selected extended view is the last available extended view for the current channel/mode. In another example, the next extended view corresponds to an empty view (e.g., "no events", "no data", etc.) when the currently selected extended view is the last available extended view in the current channel/mode.

Processing flows from extended view IDLE state 531 to the "mode splash" function when the "C" selector (e.g., "mode select") is activated as indicated by "M". Refer to FIG. 5D and related discussion for details.

Processing flows from extended view IDLE state 531 to the view function when the "D" selector is activated as indicated by "V". In another example, processing flows from extended view IDLE state 531 to the view function when a timeout interval expires (e.g., 5 seconds). Refer to FIG. 5B and related discussion for details concerning the view functions.

Processing flows from extended view IDLE state 531 to the select home channel splash function when the "C+" selector is activated as indicated by "H". Refer to FIG. 5A and related discussion for details.

Special functions may be mapped to the "A'", "B'", "A+", and "B+" selectors within the context of the current view. By activating the corresponding selector for a predetermined time interval (e.g., a 2 second timeout interval) the corresponding special function is activated as indicated by block 535. Processing continues from block 535 to block 534 where the display is updated as previously described.

Mode Splash Operating State

The model splash operating state is described as follows below with reference to FIG. 5D.

The electronic device enters the mode splash operating state at entry point M. The display is updated to indicate the currently selected mode at block 545. Processing continues to block 541 where the mode splash operating state is maintained in an IDLE state. The electronic system in the electronic device monitors the user interface (e.g., the four selectors) while in the mode splash IDLE state. When the user activates one or more of the four selectors, processing leaves the mode splash IDLE state.

The display actively maintains the current mode splash display while the mode splash view IDLE state is active at block 541. Mode splash views include graphical and/or textual elements that are arranged in a display view.

Mode splash displays may be accompanied by the activation of sound that provides an audible indicator that the selected mode has changed. The sound associated with the audible indicators may be the same for each mode splash (e.g., a beep type of indicator or sound clip), or unique based on the particular mode selected.

Processing flows from mode splash IDLE state 541 to the "previous mode" function 542 when the "A" selector is activated. Processing continues from block 542 to block 544, where the display is updated based on the newly selected mode. After the display is updated, processing returns to mode splash IDLE state 541. In one example, the previous mode corresponds to the last mode when the currently selected mode is the first available mode for the current channel.

Processing flows from mode splash IDLE state 541 to the "next mode" function 543 when the "B" selector is activated. Processing continues from block 543 to block 544, where the display is updated based on the newly selected mode. After the display is updated, processing returns to mode splash IDLE state 541. In one example, the next mode corresponds to the first mode when the currently selected mode is the last available mode for the current channel.

Processing flows from mode splash IDLE state 541 to the "channel splash" function when the "C" selector (e.g., "channel select") is activated as indicated by "CS." Refer to FIG. 5A and related discussion for details.

Processing flows from mode splash IDLE state 541 to the "select default view" function 545 when the "D" selector is activated. Alternatively, processing may flow from mode splash IDLE state 541 to the "select default view" function 545 when a timeout interval (e.g., a 2 second interval) has expired. Processing continues from block 545 to the channel view operating state as indicated by "V". Refer to FIG. 5B and related discussion for details.

Processing flows from mode splash IDLE state 541 to the select home channel splash function when the "C+" selector is activated as indicated by "H". Refer to FIG. 5A and related discussion for details.

Example Display Screen Partitions

Figure 6:
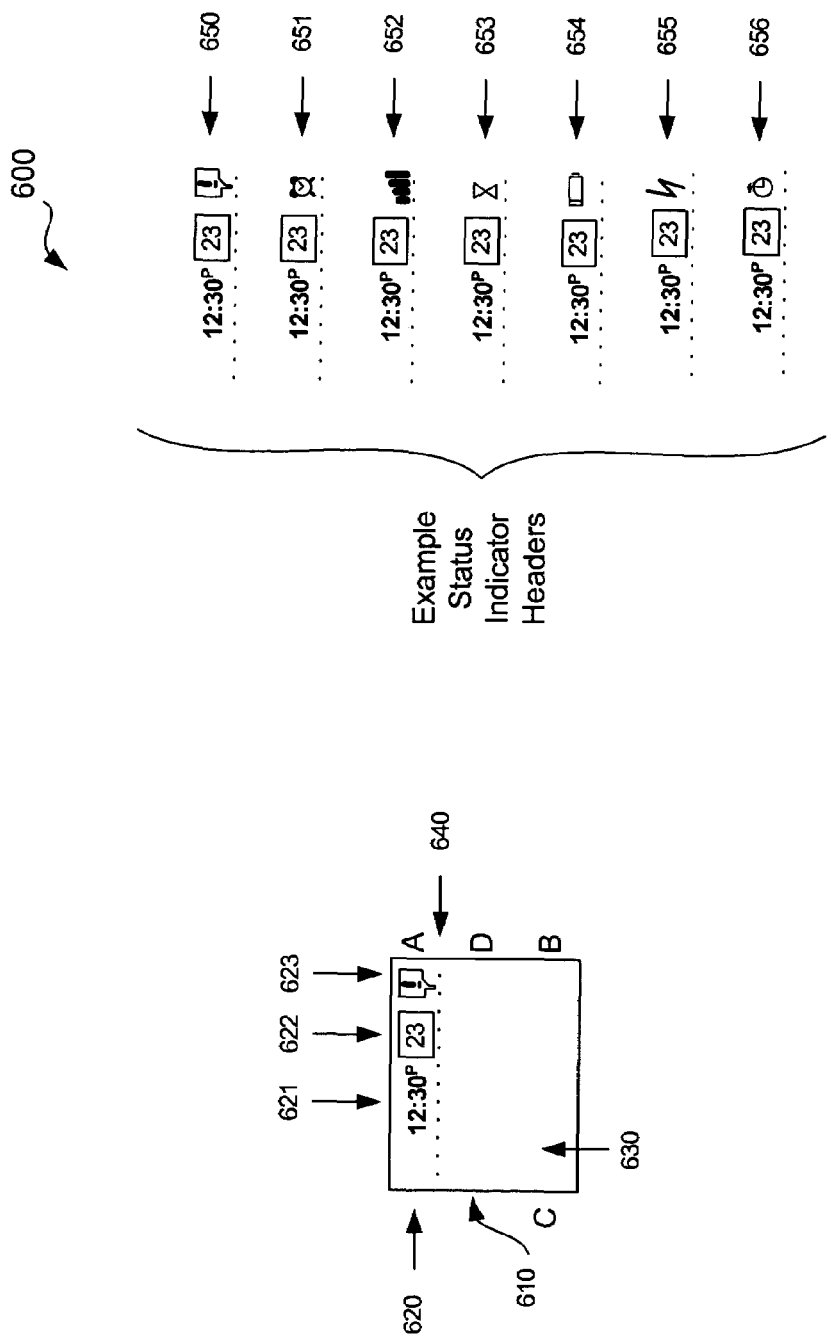
FIG. 6 shows exemplary status indicator headers.

FIG. 6 shows exemplary status indicator headers, in accordance with aspects of the present invention. Example display screen 610 is partitioned into two regions: header region 620 and main body region 630.

Main body region 630 of display screen 610 may include one or more graphical and/or textual information fields that change based on the current context in the current channel, mode, and operating state. In one example context, main body region 630 is a single region for displaying textual information, such as textual information 612. In another example context, main body section 610 may include a graphical representation.

Header region 620 of display screen 610 may include one or more graphical and/or textual information fields that change based on the current context in the current channel, mode, and operating state. In one example context, header region 620 may include two regions: current time field 621 and current date field 622. In another example context, header region 620 may include three regions: current time field 621, current date field 622, and status indicator field 623. In still another example context, header region 620 may include information relating to the channel. For example, the name of a team or player may be displayed in header region 620.

Status indicators may be associated with various conditions such as alerts in the electronic device. Example header 650 includes a status indicator for an internal alert such as an exclamation point symbol. Example header 651 includes a status indicator that an alarm is set such as an alarm clock symbol. Example header 652 includes a status indicator of signal strength in a wireless connection such as signal strength bars. Example header 653 includes a status indicator that a timer is running such as an hourglass symbol. Example header 654 includes a status indicator that the battery is low such as an empty battery symbol. Example header 655 includes a status indicator that the battery is charging such as a lightning bolt symbol. Example header 656 includes a status indicator that a timer is running such as a chronograph symbol. Other headers may also be used.

The above specification, examples and data provide a complete description of the manufacture and use of the composition of the invention. Since many embodiments of the invention can be made without departing from the spirit and scope of the invention, the invention resides in the claims hereinafter appended.

What is claimed is:

1. A method for receiving, displaying and interacting with lottery content on a mobile electronic device, comprising:
receiving the lottery channel content encoded on a communication signal that is automatically broadcast to many electronic devices, wherein the lottery channel content includes results of lottery games in a predetermined area and wherein the lottery channel content is not personalized when it is broadcast;
filtering the lottery channel content according to pre-defined user preferences; wherein the pre-defined user preferences are used to select lottery games to display on the mobile electronic device; wherein the filtering is automatically performed on the electronic device after the lottery channel content has been received on the electronic device and wherein the filtering creates personalized lottery content on the electronic device by enhancing the filtered content with additional content that is stored on the mobile electronic device;
automatically storing at least a portion of the filtered lottery content on the electronic device; wherein the at least a portion of the stored filtered lottery content includes results of the selected lottery games;
associating the lottery channel content with a channel application on the electronic device;
setting a current view associated with the lottery content; and
displaying the current view on a display of the electronic device.

2. The method of claim 1, wherein the pre-defined user preferences are obtained by receiving a configuration message indicating selected lottery games.

3. The method of claim 2, wherein the configuration message further includes a value indicating how to display results associated with the selected lottery games.

4. The method of claim 3, wherein the value indicates whether the selected lottery game includes a bonus ball, a power ball; and whether the selected lottery game is a keno-like game.

5. The method of claim 3, wherein setting the current view further comprises automatically cycling through views associated with the lottery content at a predetermined rate.

6. The method of claim 1, wherein setting the current view further comprises selecting a detail view corresponding to a glance view.

7. The method of claim 6, wherein the detailed view includes a result of a lottery game and a date of the result.

8. The method of claim 6, further comprising periodically receiving updates to the lottery content and storing the updated lottery content.

9. The method of claim 1, further adjusting the current view based on user preferences set through a web interface.

10. The method of claim 1, further comprising automatically expiring lottery content on the mobile electronic device that is out of date.

11. An apparatus for receiving, navigating, and displaying lottery content, comprising:
a data store;
a communication connection configured to receive a communication signal including the lottery content that is directed to a plurality of mobile electronic devices and store a portion of the lottery content in the data store based upon user preferences; wherein the user preferences are used to select lottery games to display on the apparatus; wherein the received lottery content is not personalized when it is received;
a display;
a user interface that includes a selector; and
an electronic system that is arranged to interact with the user interface, the data store, the communication connection, and the display, wherein the electronic system is configured to:
automatically personalize the received lottery content on the apparatus based upon the user preferences by enhancing the received lottery content with additional content that is stored on the mobile electronic device;
automatically store results of the selected lottery games in the data store;

select a current view from a selection of lottery views; and
display the current view on the display.

12. The apparatus of claim 11, wherein the electronic system is further configured to select a details view associated with the current view in response to the selector, wherein the details view shows details associated with a selected lottery game.

13. The apparatus of claim 12, further comprising automatically expiring the lottery content on the mobile electronic device.

14. The apparatus of claim 11, wherein the electronic system is further configured to automatically receive the communication signal including the lottery content that includes updates to the lottery content.

15. The apparatus of claim 11, wherein the communication connection is further configured to receive a communication signal including configuration parameters relating to the user preferences.

16. The apparatus of claim 11, wherein the electronic system is further configured to create an animation.

17. A system for providing and interacting with lottery content associated, comprising:
   a mobile electronic device, having:
      a data store;
      a communication connection configured to receive a communication signal transmitted from a broadcast device that is configured to transmit the communication signal including at least a portion of the lottery content to a plurality of mobile electronic devices at the same time and store at least a portion of the lottery content in the data store based on user preferences; wherein the user preferences are used to select lottery games to display on the mobile electronic device; wherein each of the mobile electronic devices may have different user preferences regarding the lottery content included within the communication signal;
      a display;
      a user interface that includes a selector; and
      an electronic system that is arranged to interact with the communication connection, the user interface, the data store and the display, wherein the electronic system is configured to:
         automatically personalize the received lottery content on the electronic system according to the user preferences that are associated with the mobile device by enhancing the received lottery content with additional content that is stored on the mobile electronic device;
         automatically store results of the selected lottery games in the data store;
         select a current view associated with the lottery content;
         change the current view in response to the selector; and
         display the current view on the display.

18. The system of claim 17, wherein the broadcast device is configured to broadcast an FM communication signal.

19. The system of claim 17, further comprising a server configured to receive user preferences associated with users receiving the diversion content.

20. The system of claim 17, wherein the communication signal includes a configuration message for the mobile electronic device that includes the user preferences.

21. The system of claim 20, wherein the configuration message further includes a value indicating how to display results associated with the selected lottery game, wherein the value indicates whether the selected lottery game includes a bonus ball, a power ball; and whether the selected lottery game is a keno-like game.

22. The system of claim 17, wherein the broadcast device is further configured to transmit a communication signal including lottery content for a region where the broadcast device is located.

23. The system of claim 17, wherein the electronic system is further configured to display an animation.

24. The system of claim 17, wherein the mobile electronic device is further configured to store names that do not frequently change such that the broadcast device may broadcast an index value to indicate one of the names that does not change.

* * * * *